(12) United States Patent  
Sakurada

(10) Patent No.: US 7,628,523 B2  
(45) Date of Patent: *Dec. 8, 2009

(54) LIGHT SUPPLY UNIT, ILLUMINATION UNIT, AND ILLUMINATION SYSTEM

(75) Inventor: Takashi Sakurada, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/073,732

(22) Filed: Mar. 10, 2008

(65) Prior Publication Data

US 2008/0225550 A1 Sep. 18, 2008

Related U.S. Application Data

(62) Division of application No. 11/256,181, filed on Oct. 24, 2005, now Pat. No. 7,360,934.

(51) Int. Cl.
*F21V 8/00* (2006.01)

(52) U.S. Cl. .................... 362/553; 362/551; 362/555

(58) Field of Classification Search ............. 362/551, 362/555, 553, 583, 558
See application file for complete search history.

(56) References Cited

U.S. PATENT DOCUMENTS

| | | | |
|---|---|---|---|
| 5,301,090 A | 4/1994 | Hed | |
| 6,072,280 A | 6/2000 | Allen | |
| 6,152,588 A | 11/2000 | Scifres | |
| 6,382,824 B1 | 5/2002 | Prasad et al. | |
| 6,550,926 B2 | 4/2003 | Berger | |
| 7,071,616 B2 | 7/2006 | Shimizu et al. | |
| 7,249,868 B2* | 7/2007 | Chinniah et al. | 362/294 |
| 7,360,934 B2* | 4/2008 | Sakurada | 362/553 |
| 2004/0165380 A1* | 8/2004 | Chew | 362/235 |

FOREIGN PATENT DOCUMENTS

| | | |
|---|---|---|
| JP | 01-160616 | 11/1989 |
| JP | 02-041948 | 2/1990 |
| JP | 03-12287 | 2/1991 |
| JP | 6-17012 | 3/1994 |
| JP | 08-007625 | 1/1996 |
| JP | 08-024211 | 1/1996 |
| JP | 08-116309 | 5/1996 |
| JP | 08-138414 | 5/1996 |
| JP | 09-017231 | 1/1997 |

(Continued)

OTHER PUBLICATIONS

Japanese Office Action for Corresponding Japanese Patent Application No. JP 2003-301836, dispatched Apr. 11, 2006.

(Continued)

*Primary Examiner*—Stephen F Husar
*Assistant Examiner*—James W Cranson
(74) *Attorney, Agent, or Firm*—McDermott Will & Emery LLP

(57) ABSTRACT

A light supply unit comprises optical fibers, LEDs, optical connectors, and a controller. The optical fibers constitute optical fiber groups which extend to their respective illumination positions different from each other. The optical connectors optically connect one ends of the optical fibers to the respective LEDs. The controller controls light emissions of the respective LEDs.

35 Claims, 21 Drawing Sheets

FOREIGN PATENT DOCUMENTS

| | | |
|---|---|---|
| JP | 10-206700 | 8/1998 |
| JP | 11-026170 | 1/1999 |
| JP | 11-122000 | 4/1999 |
| JP | 2000-021206 | 1/2000 |
| JP | 2000-149608 A | 5/2000 |
| JP | 2000-326786 A | 11/2000 |
| JP | 2000-357406 | 12/2000 |
| JP | 2001-023420 A | 1/2001 |
| JP | 2001-118411 A | 4/2001 |
| JP | 2001-291901 | 10/2001 |
| JP | 2001-319512 | 11/2001 |
| JP | 2002-042525 A | 2/2002 |
| JP | 2002-093587 A | 3/2002 |
| JP | 2002-170404 | 6/2002 |
| JP | 2002-170416 | 6/2002 |
| JP | 2002-286978 | 10/2002 |
| JP | 2002-299700 | 10/2002 |
| JP | 2002-304903 | 10/2002 |
| JP | 2002-304904 | 10/2002 |
| JP | 2003-124528 | 4/2003 |
| JP | 2003-124528 A | 4/2003 |
| JP | 2003-208993 | 7/2003 |
| JP | 2004-104094 | 4/2004 |
| JP | 2005-019154 | 1/2005 |
| JP | 2005-019155 | 1/2005 |
| WO | WO 01/40702 A1 | 6/2001 |

OTHER PUBLICATIONS

Japanese Office Action, with English translation, issued in Japanese Patent Application No. JP 2006-162562, mailed Jun. 24, 2008.

* cited by examiner

LIGHT SUPPLY UNIT, ILLUMINATION UNIT, AND ILLUMINATION SYSTEM

RELATED APPLICATIONS

This application is a Divisional of U.S. application Ser. No. 11/256,181, filed Oct. 24, 2005, now U.S. Pat. No. 7,360,934 the entire content of which is hereby incorporated by reference.

BACKGROUND OF THE INVENTION

1. Field of the Invention

The present invention relates to a light supply unit, an illumination unit, and an illumination system comprising semiconductor light emitting devices such as light emitting diodes (LEDs) or laser diodes (LDs).

2. Related Background Art

Various types of white LEDs and LDs have been developed in recent years. The white LEDs (LDs) emit white light by mixing blue light or ultraviolet light with fluorescent light excited by the blue light or the ultraviolet light. GaN-based or ZnSe-based blue LEDs (LDs) can emit the blue light, and GaN-based ultraviolet LEDs (LDs) can emit the ultraviolet light.

There are proposed illumination systems comprising such white LEDs. For example, a conventional illumination system 100, shown in FIG. 1, comprises a plurality of LEDs 101 arranged on a substrate 102. The LEDs 101 are supplied with a supply voltage to emit light. The supply voltage is supplied through a wire 103.

An example of conventional illumination system having a plurality of LEDs is disclosed in Japanese Patent Application Laid-Open No. 2000-21206. In the illumination system, light from the LEDs is guided into a plurality of optical fibers forming an optical fiber bundle.

SUMMARY OF THE INVENTION

In the illumination systems having semiconductor light emitting devices such as the LEDs, heat is generated by part of the power supplied to the semiconductor light emitting devices. The heat causes increase in the temperature around the semiconductor light emitting devices. Thereby, adverse effects will occur, such as reduction in internal quantum efficiency, reduction in light extraction efficiency, and decrease of the lifetime. An illumination system is required to generate a sufficient quantity of light in a limited space. But if semiconductor light emitting devices are arranged so densely, the foregoing adverse effects will occur. If the power supplied to the semiconductor light emitting devises is increased, a large electric current will flow through wire, so as to increase concerns about troubles such as a short circuit. If the number of semiconductor light emitting devices is reduced or the power to be supplied to the semiconductor light emitting devices is reduced in order to suppress the foregoing adverse effects, the illumination system will result in shortage of illumination intensity, which is not practical.

In the illumination system disclosed in Japanese Patent Application Laid-Open No. 2000-21206, the light intensities of the LEDs are adjusted together by PWM. In this illumination system, however, consideration is given to adjustment of the light intensities only at one illumination position. Therefore, for illuminating a plurality of illumination positions, a plurality of illumination systems corresponding to the illumination positions adjust individually in the illumination intensity. Because of that, the illumination systems can't adjust efficiently illumination intensities at the respective illumination positions. Then, for example, in case of constructing an energy saving system for reusing the heat generated from the LEDs, we have to reuse the heat individually generated from the illumination systems, and it will be difficult to efficiently reuse the heat.

In the above circumstances, it is an object of the present invention to provide a light supply unit, an illumination unit, and an illumination system which is able to adjust efficiently illumination intensities at least two illumination positions, and to radiate (reuse) efficiently heat generated in semiconductor light emitting devices.

In accordance with an aspect of the invention, the present invention provides a light supply unit comprising at least two optical fiber groups including a plurality of optical fibers having first ends and second ends; a plurality of semiconductor light emitting devices; a plurality of optical connectors, provided for the respective semiconductor light emitting devices, for optically connecting the first ends of the optical fibers to the respective semiconductor light emitting devices; and a controller, electrically connected to the semiconductor light-emitting devices, for controlling light emissions of the semiconductor light emitting devices; wherein said optical fiber groups extend from the first ends to respective illumination positions different from each other.

DESCRIPTION OF THE PREFERRED EMBODIMENTS

In the following, the present invention will be explained in detail with reference to the drawings.

First Embodiment

Figure 2:
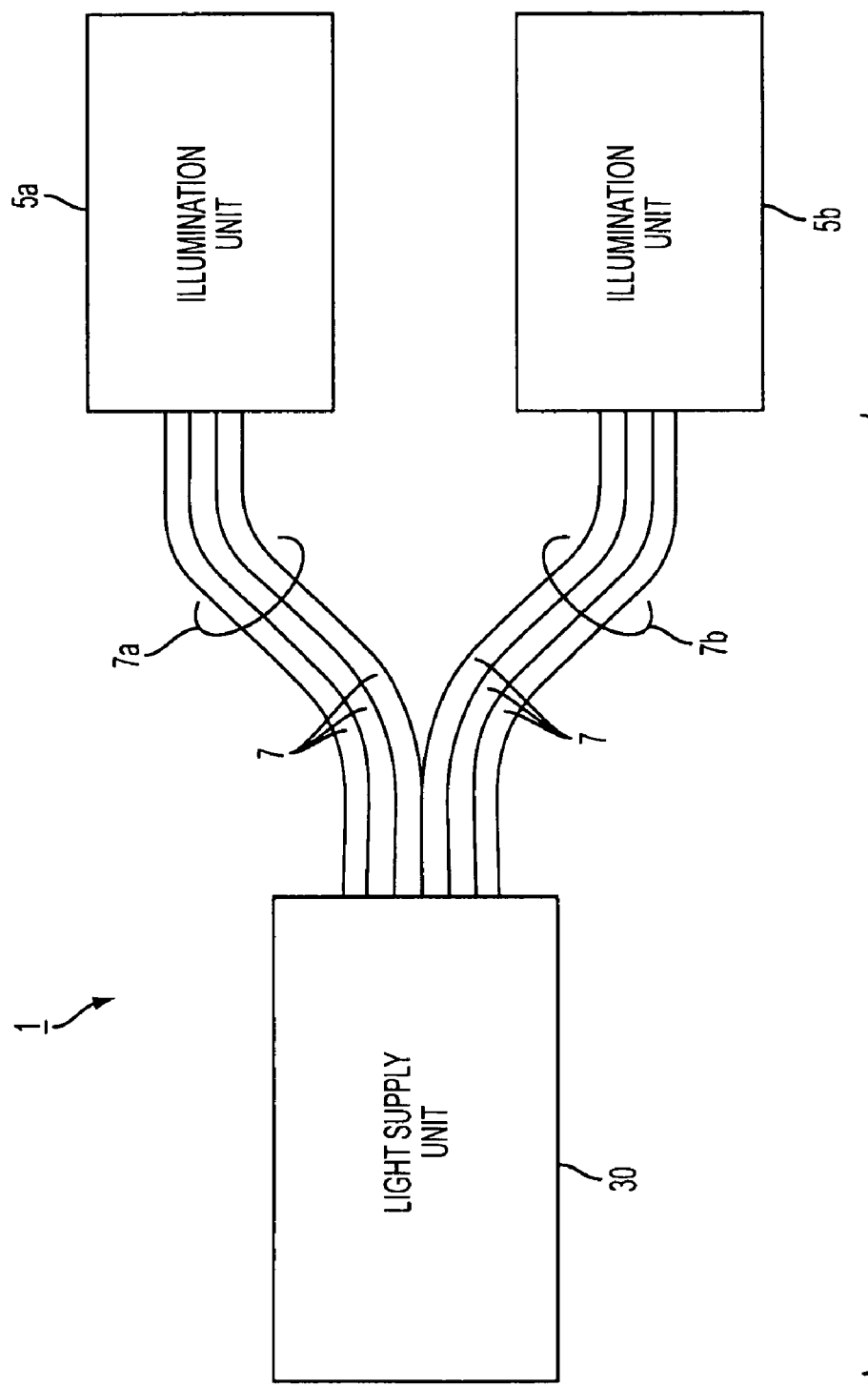
FIG. 2 is a block diagram showing an embodiment of the illumination system according to the present invention.

FIG. 2 is a block diagram showing an embodiment of the illumination system according to the present invention. Referring to FIG. 2, the illumination system 1 according to the present embodiment is provided with a light supply unit 3, and illumination units 5a and 5b. The light supply unit 3 has a main body 30 and two optical fiber groups 7a and 7b. The optical fiber groups 7a and 7b include a plurality of optical fibers 7. The optical fiber groups 7a and 7b extend from one ends, which are the first ends in the present embodiment, to their respective illumination positions different from each other. The first ends of the optical fibers 7 are optically coupled to the main body 30 of the light supply unit 3. The other ends, which are the second ends in the present embodiment, of the optical fibers 7 belonging to the optical fiber group 7a are optically coupled to the illumination unit 5a. The other ends, which are also the second ends in the present embodiment, of the optical fibers 7 belonging to the optical fiber group 7b are optically coupled to the illumination unit 5b. The illumination units 5a and 5b are located at the respective illumination positions. In the present embodiment, the light supply unit 3 has six optical fibers 7, three of which constitute the optical fiber group 7a and the other three of which constitute the optical fiber group 7b.

Figure 3:
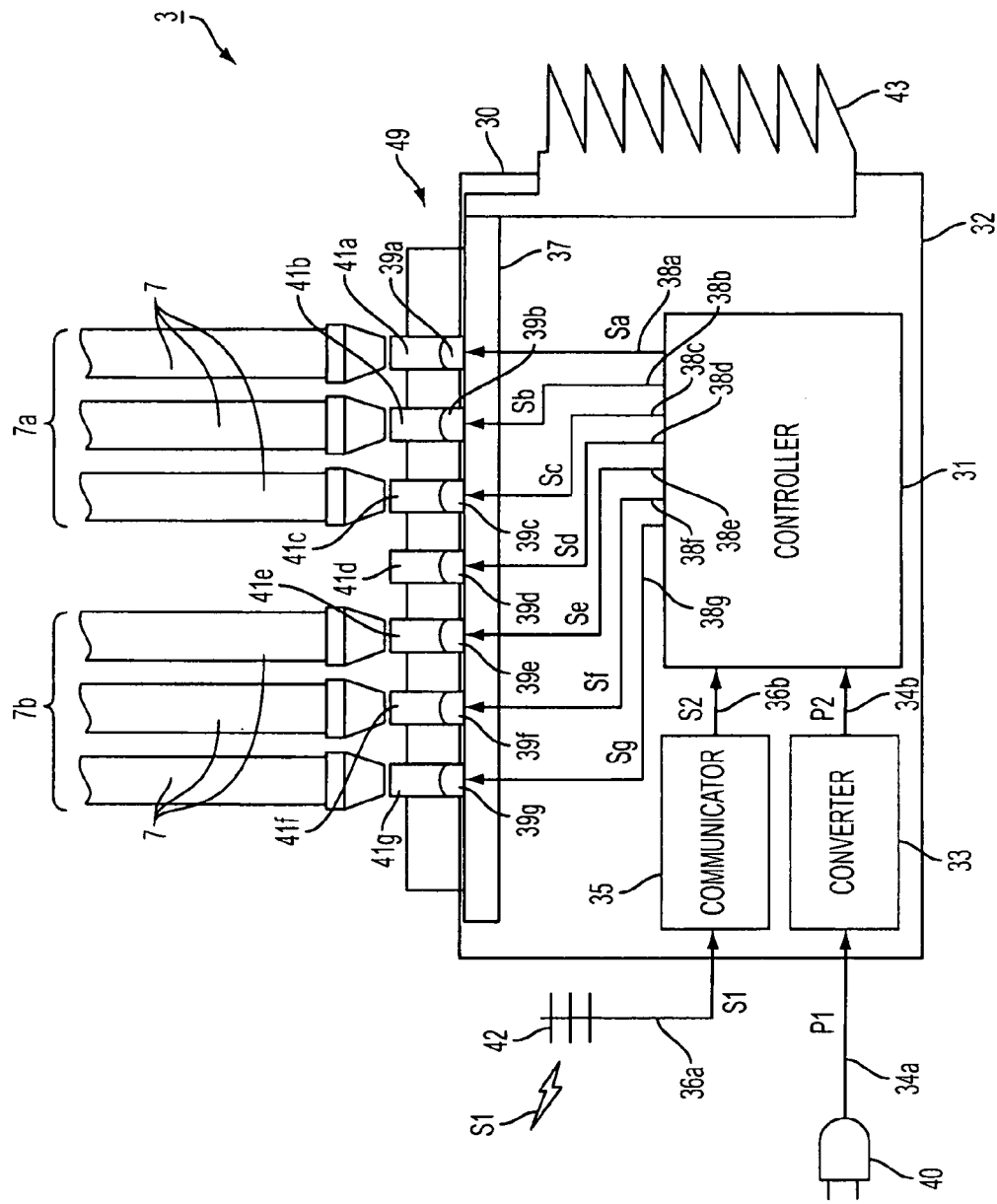
FIG. 3 is a configuration diagram showing a light supply unit according to the embodiment.

The light supply unit 3 is an apparatus for supplying illumination light to the illumination units 5a and 5b. The main body 30 of the light supply unit 3 is located, for example, at a place distant from the illumination units 5a and 5b. FIG. 3 is a configuration diagram showing the light supply unit 3 of the present embodiment. Referring to FIG. 3, the main body 30 comprises a controller 31, a housing 32, a converter 33, a communicator 35, a plug 40, an antenna 42, a radiator plate 43, and a module 49. The controller 31, the converter 33, and the communicator 35 are contained in the housing 32.

The module 49 has a substrate 37, semiconductor light emitting devices 39a-39g such as LEDs or LDs, and photo units 41a-41g. The photo units 41a-41g are packages with optical connectors provided for the respective light emitting devices 39a-39g, and the light emitting devices 39a-39g are mounted on the respective photo units 41a-41g. The photo units 41a-41g are mounted on the substrate 37 which is contained in the housing 32. The photo units 41a-41g optically connect the first ends of the optical fibers 7 to the respective light emitting devices 39a-39g. Namely, the photo units 41a-41g hold the first ends of the optical fibers 7 so that light from each light emitting device 39a-39g is incident to the first end of the corresponding optical fiber 7. The photo units 41a-41g may have collective lenses respectively for collecting the light from the light emitting devices 39a-39g. The respective photo units 41a-41g may have filters respectively for changing the color tone of the light from the light emitting devices 39a-39g. The photo units 41a-41g are preferably those with small coupling loss and preferably those with high heat resistance and weather resistance.

The light emitting devices 39a-39c out of the light emitting devices 39a-39g are provided corresponding to the respective optical fibers 7 in the optical fiber group 7a. The light emitting devices 39e-39g are provided corresponding to the respective optical fibers 7 in the optical fiber group 7b. The light emitting devices 39a-39g can be, for example, lamp type LEDs, surface emission-type LEDs, and so on. The light emitting devices 39a-39g can be LEDs or LDs to emit visible light such as red, green, or blue. Among these, the blue LEDs and LDs suitably applicable are, for example, those made of a GaN-based semiconductor or a ZnSe-based semiconductor.

The light emitting devices 39a-39g can also be white LEDs, ultraviolet LEDs or LDs, or the like. The white LEDs can be selected according to purpose from those of various types. A type of those can emit white light by mixing of fluorescent yellow light from a fluorescent substance excited by blue light from a blue LED or LD, with the blue light. Another type of those has a red LED (or a red LD), a green LED (or a green LD), and a blue LED (or a blue LD). Another type of those can emit white light by mixing of fluorescent red light, fluorescent green light, and fluorescent blue light emitted from fluorescent substances excited by the ultraviolet LEDs (or the ultraviolet LDs) or the like. The present embodiment is assumed to use ultraviolet LEDs as the light emitting devices 39a-39g. The ultraviolet LEDs suitably applicable herein are, for example, those made of a GaN-based semiconductor.

The optical fibers 7 suitably applicable are those with small transmission loss for the emission wavelength of the light emitting devices 39a-39g. Plastic optical fibers or silica fibers can be used as the optical fibers 7 according to use. Particularly, where the LEDs are used as semiconductor light emitting devices, the coupling loss between light emitting devices 39a-39g and optical fibers 7 can be kept low by use of plastic fibers with a large core diameter and a large numerical aperture. PMMA (polymethylmethacrylate) or PC (polycarbonate) type fibers can be suitably applied as the plastic fibers. The PC fibers have high heat resistance but have the transmission loss larger than the PMMA fibers. Therefore, either of them can be suitably used according to use. Where the distance is relatively large between the main body 30 of the light supply unit 3 and the illumination unit 5a (5b), it is preferable to use HPCF (hard polymer clad fiber) with smaller transmission loss. The length of the optical fibers 7 is a length necessary for wiring and is generally not less than 3 [m]. The transmission loss of the optical fibers 7 is, for example, 400 [dB/km] or less, preferably 50 [dB/km] or less, and still more preferably 20 [dB/km] or less for light wavelengths of 0.4-0.6 [μm]. Since the HPCFs have a smaller core diameter than the PC and PMMA fibers, it is preferable to provide collective lenses such as ball lenses inside the photo units 41a-41g in use of the HPCFs. The coupling efficiency between optical fibers 7 and light emitting devices 39a-39g can be increased by forming microlenses on surfaces of light emitting devices 39a-39g, or by use of LEDs adjusted in the direction of emission of light by a photonic crystal, such as a photonic crystal slab or a photonic crystal which includes microscopic cylinder.

The substrate 37 is made of a material, for example, selected from metals with excellent heat conduction such as Cu and Al, composite materials such as Cu—W and Al—SiC, ceramics such as AlN and BN, and materials such as CVD diamond. The substrate 37 functions as a heat sink for radiating heat generated in the light emitting devices 39a-39g. The substrate 37 is arranged so that the edge thereof is in contact with the radiator plate 43. The radiator plate 43 has a plurality of radiating fins projected to the outside of the housing 32. The heat generated in the light emitting devices 39a-39g is radiated through the substrate 37 and the radiator plate 43 to the outside of the housing 32. The photo units 41a-41g are preferably arranged on the substrate 37 with an appropriate spacing so as to enhance the heat radiation of the light emitting devices 39a-39g. In order to more efficiently radiate the heat from the light emitting devices 39a-39g, the light emitting devices 39a-39g are preferably mounted by flip chip bonding or by face down bonding in the photo units 41a-41g.

The converter 33 is a device for converting an AC power P1 supplied from the outside of the light supply unit 3, into a DC power P2. The converter 33 is electrically connected through wire 34a to plug 40 and is also electrically connected through wire 34b to controller 31. The plug 40 is plugged, for example, into a socket for distribution of AC power set in a building or the like. The converter 33 receives the AC power P1 through plug 40 and wire 34a from the AC power distribution socket. The converter 33 converts the AC power P1 into the DC power P2 through commutation or the like and supplies the DC power P2 through wire 34b to the controller 31.

The communicator 35 is a device for receiving an indication signal S1 indicating the light emissions of the light emitting devices 39a-39g from the outside of the light supply unit 3, and for providing the indication signal for the controller 31. The communicator 35 is electrically connected through wire 36a to antenna 42 and is also electrically connected through wire 36b to the controller 31. The antenna 42 receives the indication signal S1 from the outside of the light supply unit 3 by radio. In the present embodiment the indication signal S1 is transmitted from the illumination units 5a and 5b. The communicator 35 receives the indication signal S1 and converts the indication signal S1 into an indication signal S2 of a preferred form to be provided for the controller 31. The communicator 35 provides the indication signal S2 through wire 36b to the controller 31.

The controller 31 is a device for controlling the light emissions of the respective light emitting devices 39a-39g. The controller 31 is electrically connected through wires 38a-38g to the light emitting devices 39a-39g. The controller 31 generates drive voltages Sa-Sg for the light emitting devices 39a-39g according to the indication signal S2 from the communicator 35. The controller 31 provides the drive voltages Sa-Sg for the light emitting devices 39a-39g. The controller 31 can be suitably configured to adjust light emission intensities of the light emitting devices 39a-39g so as to alleviate heat of the light emitting devices 39a-39g, based on the indication contents of the indication signal S2 and, in addition thereto, for example, based on continuous operation times, power consumptions, etc. of the light emitting devices 39a-39g. In this case, the controller 3 can be suitably configured to control the total light emission intensity of all the light emitting devices 39a-39g in consideration of necessary light intensities at the respective illumination positions, for example, by mainly reducing the light emission intensities of light emitting devices for providing light to the illumination position with lower priority. Alternatively, the controller 31 can be configured to temporally control the light emission intensities of the light emitting devices 39a-39g, for example, so as to turn off the light emitting devices if the illumination time exceeds a predetermined time; this permits the light supply unit 3 to suitably perform an energy saving operation.

Figure 4:
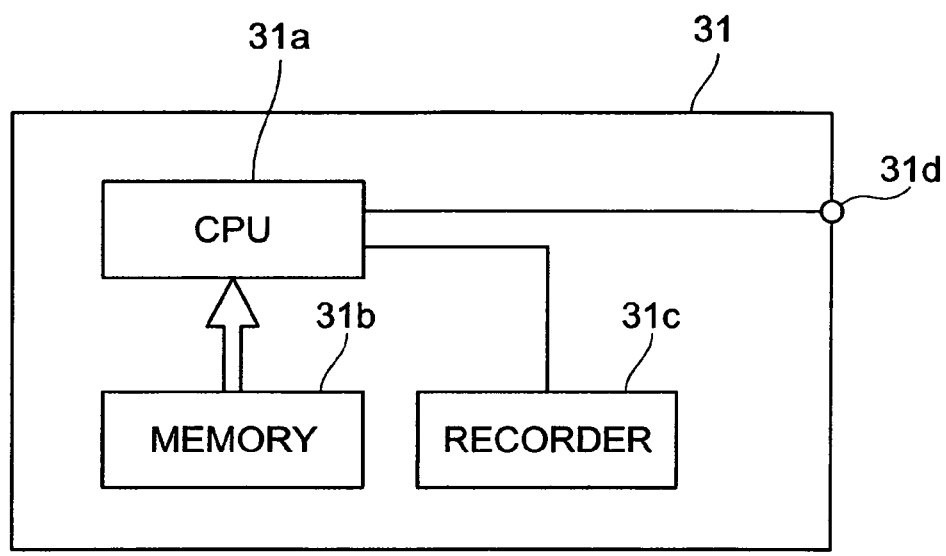
FIG. 4 is a configuration diagram showing a controller of the light supply unit according to the embodiment.

The controller 31, shown in FIG. 4, is preferably comprised of a computer with a CPU 31a and a memory 31b, for example. In this case, a program for controlling the light emissions of the light emitting devices 39a-39g is stored in the memory 31b. The CPU 31a reads the program from the memory 31b and executes the program. The controller 31 is preferably provided with a recorder 31c such as a memory for recording operation logs of the light emitting devices 39a-39g. Alternatively, the controller 31 is preferably provided with an output terminal 31d for outputting the operation log data of the light emitting devices 39a-39g to the outside of the light supply unit 3. When the controller 31 is provided with either of these recorder 31c and output terminal 31d, it becomes feasible to extract the operation logs of the light emitting devices 39a-39g and to use the operation logs for design of an energy saving system.

Figure 1:
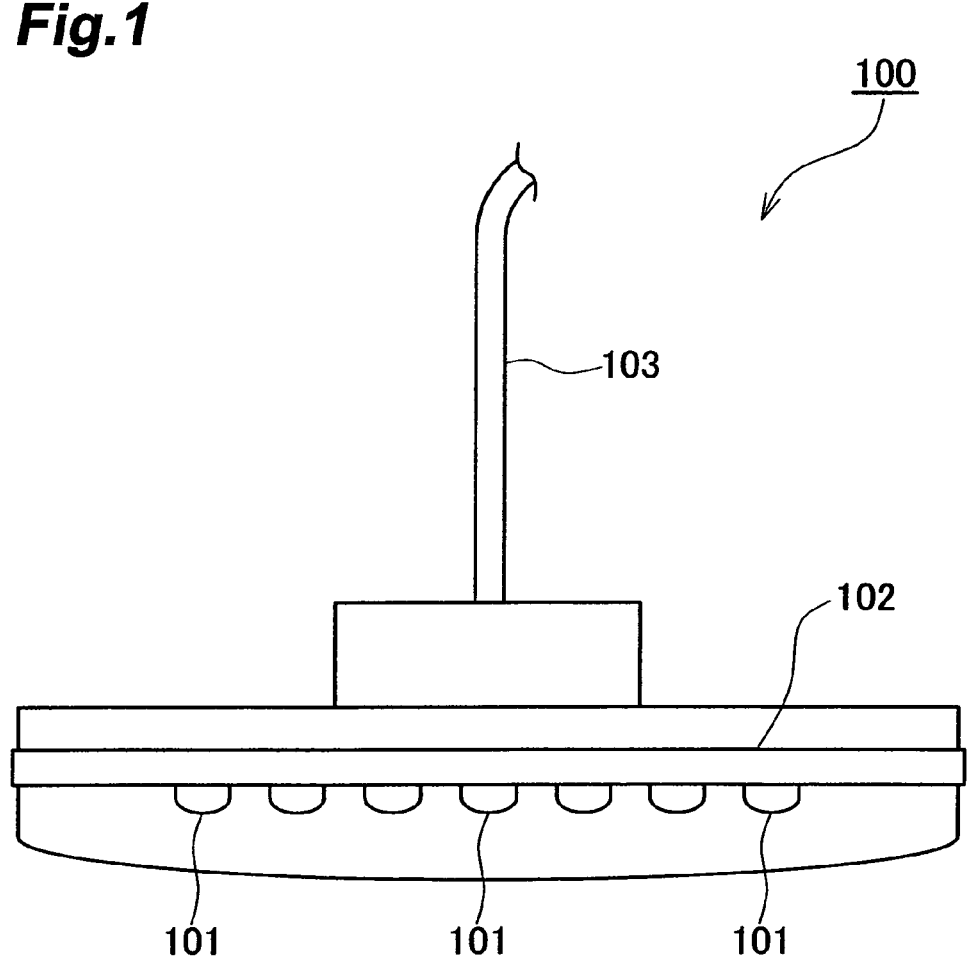
FIG. 1 is an illustration showing a conventional illumination system.
Figure 5:
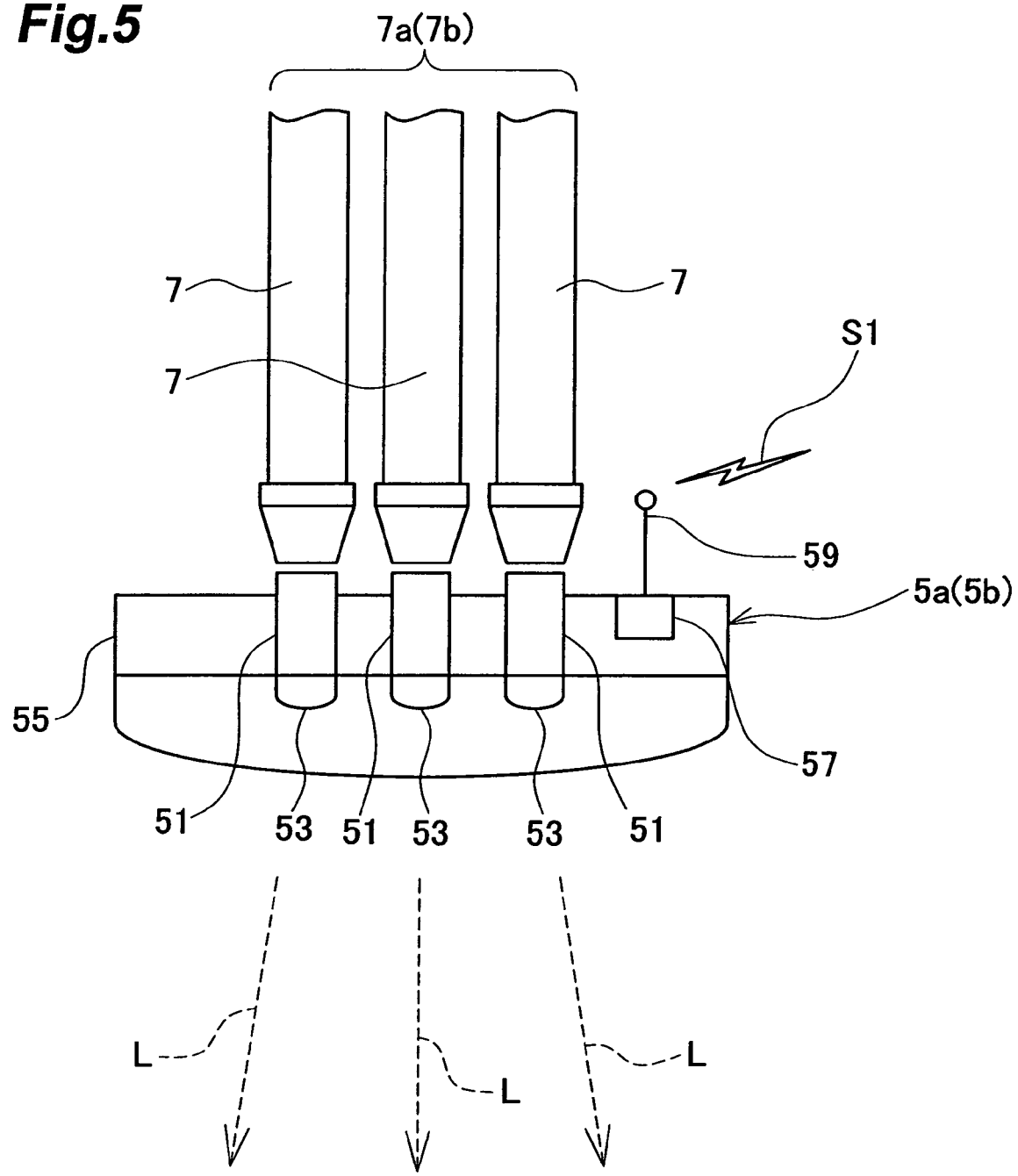
FIG. 5 is a configuration diagram showing an illumination unit according to the embodiment.

Reference is made again to FIG. 1. The illumination units 5a and 5b are devices for irradiating the light supplied from the light supply unit 3, as illumination light. FIG. 5 is a configuration diagram showing the illumination unit 5a (5b) of the present embodiment. With reference to FIG. 5, the illumination unit 5a (5b) is provided with optical connectors 51, fluorescent parts 53, a base 55, a remote-control signal receiver 57, and a radiowave output terminal 59.

There are a plurality of optical connectors 51 and fluorescent parts 53 provided as paired. The optical connectors 51 and fluorescent parts 53 are fixed on the flat-plate base 55. In the present embodiment, the optical connectors 51 and fluorescent parts 53 are provided three each corresponding to the number of optical fibers 7 constituting the optical fiber group 7a (7b). Each optical connector 51 is a holder for holding the second end of optical fiber 7. The optical connector 51 holds the second end of optical fiber 7 so that the light from the optical fiber 7 is projected in directions of illumination (arrows L in the drawing).

The fluorescent parts 53 are excited by ultraviolet light from the light emitting devices 39a-39c (39e-39g) of the light supply unit 3 to emit fluorescent visible light (red light, green light, and blue light in the present embodiment) of a longer wavelength than the ultraviolet light. The red light, green light, and blue light from the fluorescent parts 53 are mixed to yield white light, and the white light is projected to the illumination directions. The fluorescent light color of the fluorescent parts 53 may be one of red light, green light, and blue light, or may be another color. For example, where the light emitting devices 39a-39c (39e-39g) of the light supply unit 3 emit blue light, the fluorescent light color of the fluorescent parts 53 can be yellow color, whereby white light can be suitably generated through mixing of the blue light with the fluorescent yellow light. The fluorescent light color of the fluorescent parts 53 can be suitably determined according to preference or necessity of the illumination color. The fluorescent parts 53 may be selected from solid fluorescent substances, resins containing fluorescent particles, and those in which a thin film having a fluorescent material formed on a surface of a transparent member. Since in the present embodiment the light emitting devices 39a-39c emit the ultraviolet light, it is also possible to use fluorescent materials used in the conventional fluorescent tubes.

The remote-control signal receiver 57 is a device for receiving an indication signal from a remote controller. The remote controller gives indications such as adjustment of illumination intensity, an off time, etc. in addition to on/off of illumination. The remote-control signal receiver 57 receives these indications from the remote controller in the form of an infrared light signal or radio wave signal, and converts the infrared light signal or radio wave signal into the indication signal S1 being an electric signal. The remote-control signal receiver 57 sends the indication signal S1 from the radiowave output terminal 59 by radio. The indication signal S1 is received through the antenna 42 by the communicator 35 in the light supply unit 3.

Figure 6:
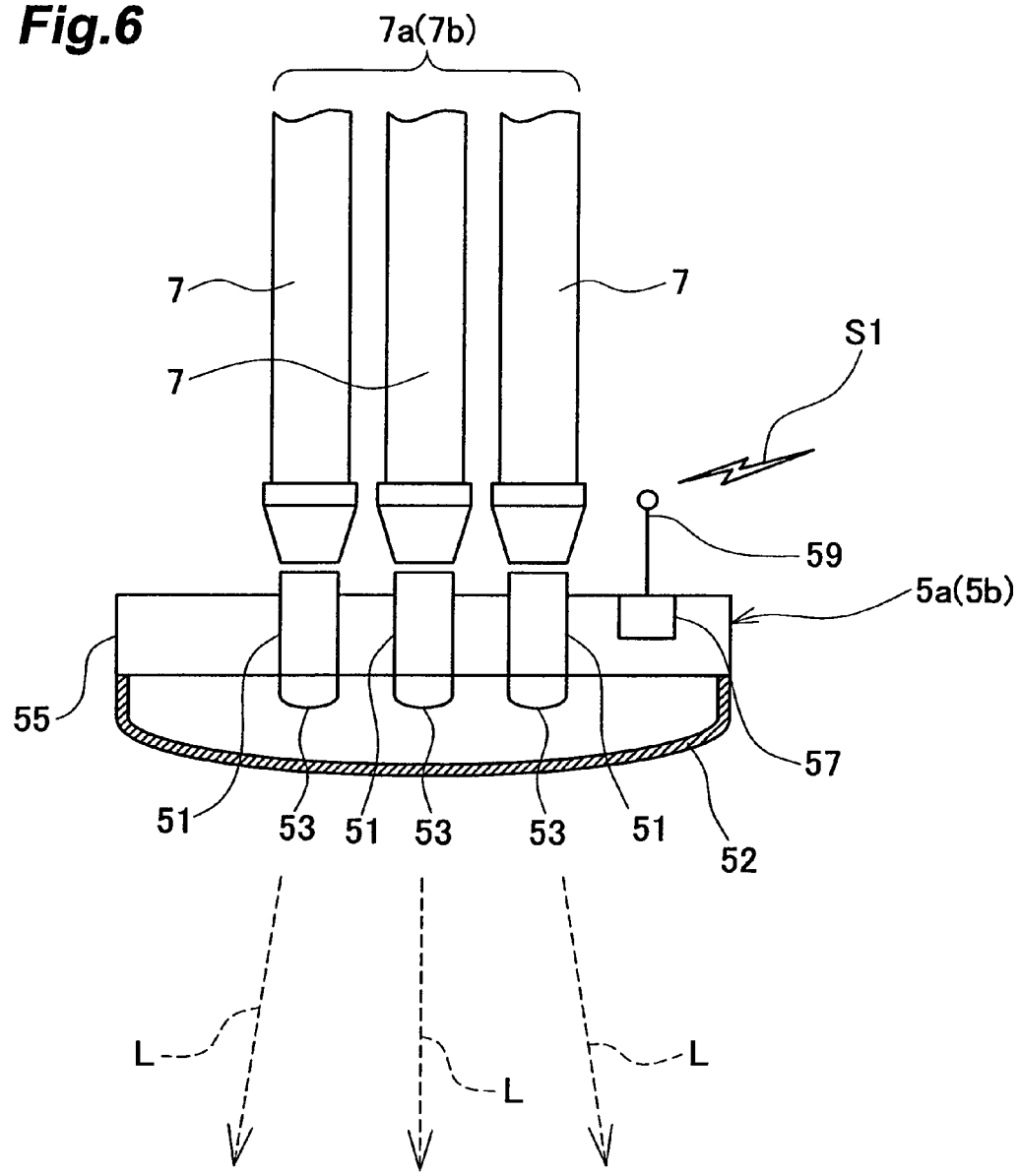
FIG. 6-8 are configuration diagrams showing variations of an illumination unit of the embodiment.

As shown in FIG. 6, the illumination unit 5a (5b) may comprise a filter 52. The filter 52 may be a color filter and/or a light diffusing filter. In the present embodiment, where the illumination unit 5a (5b) is provided with the filter 52, the filter 52 is optically coupled through the fluorescent parts 53 to the second ends of the optical fibers 7. When the illumination unit 5a (5b) is provided with the filter 52, it becomes feasible to readily adjust the color tone and light distribution of the illumination color.

Figure 7:
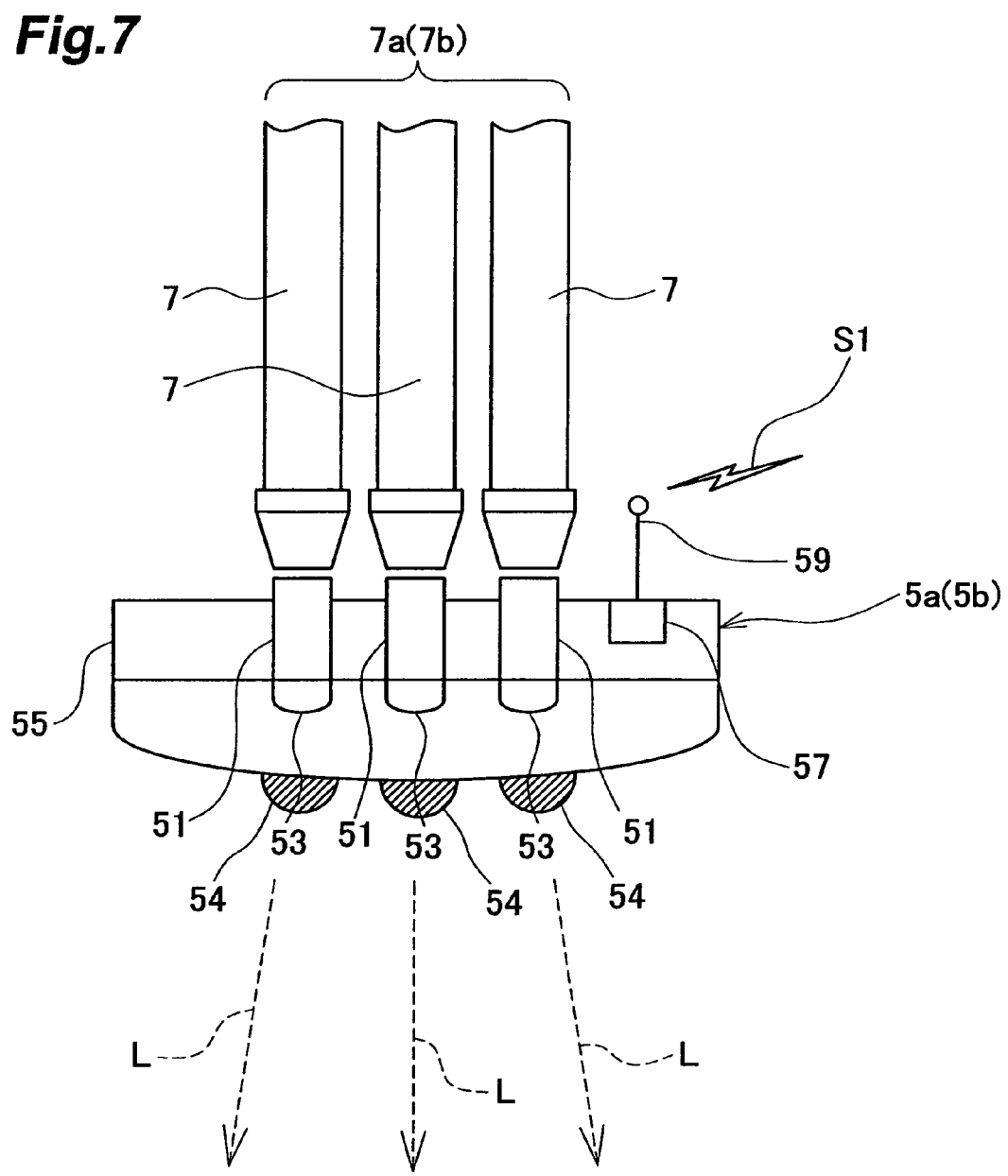
Figure 8:
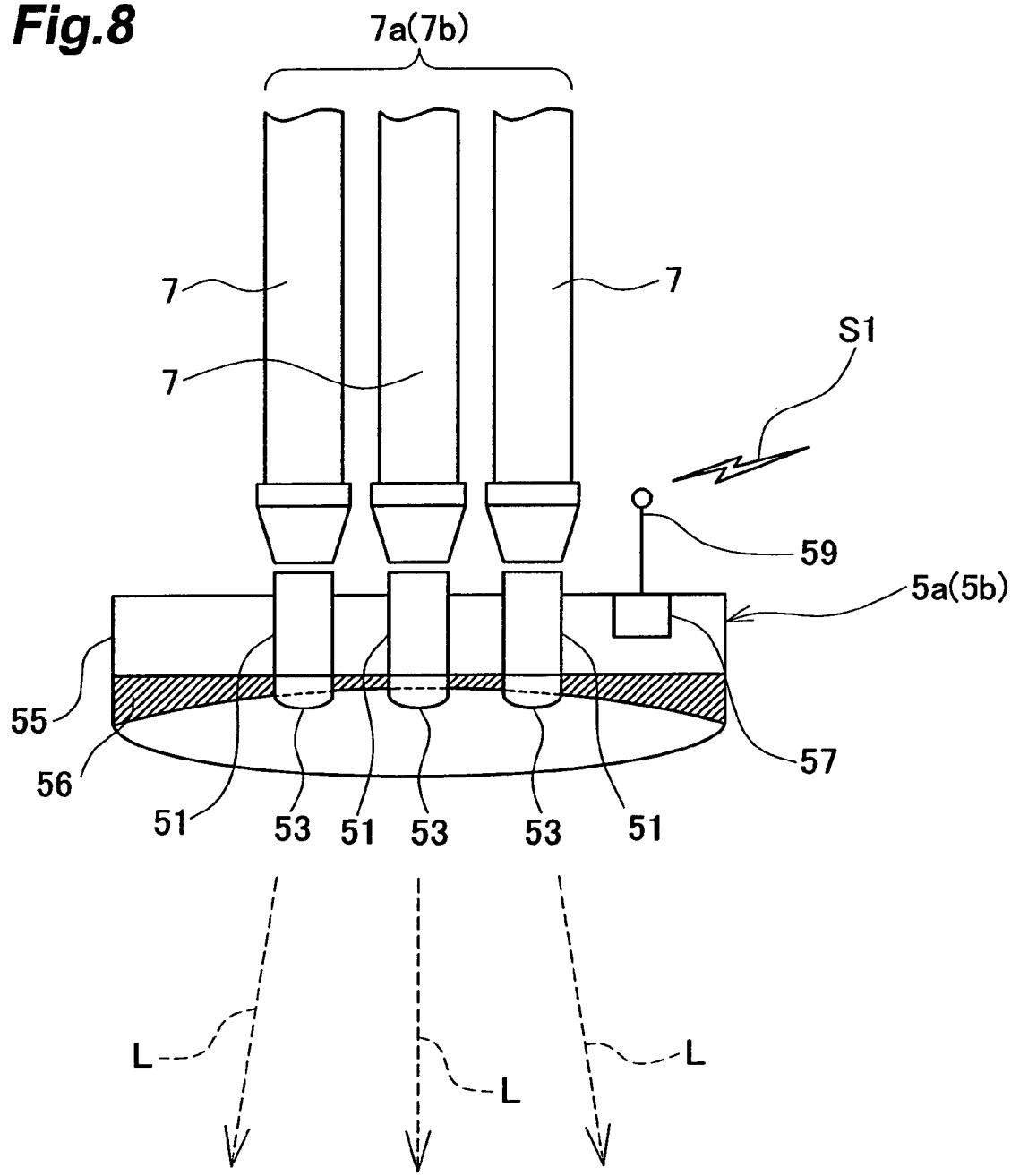

The illumination unit 5a (5b) may comprise lenses 54 shown in FIG. 7 and/or a light reflector such as a mirror 56 shown in FIG. 8. In the present embodiment, where the illumination unit 5a (5b) is provided with the lenses 54 and/or the light reflector 56, the lenses 54 and the light reflector 56 are optically coupled through the fluorescent parts 53 to the second ends of the optical fibers 7. When the illumination unit 5a (5b) is provided with at least one of the lenses 54 and the light reflector 56, it becomes feasible to adopt various light distribution designs for the illumination unit 5a (5b), such as diffusion or collection of illumination, or reflection.

Figure 9:
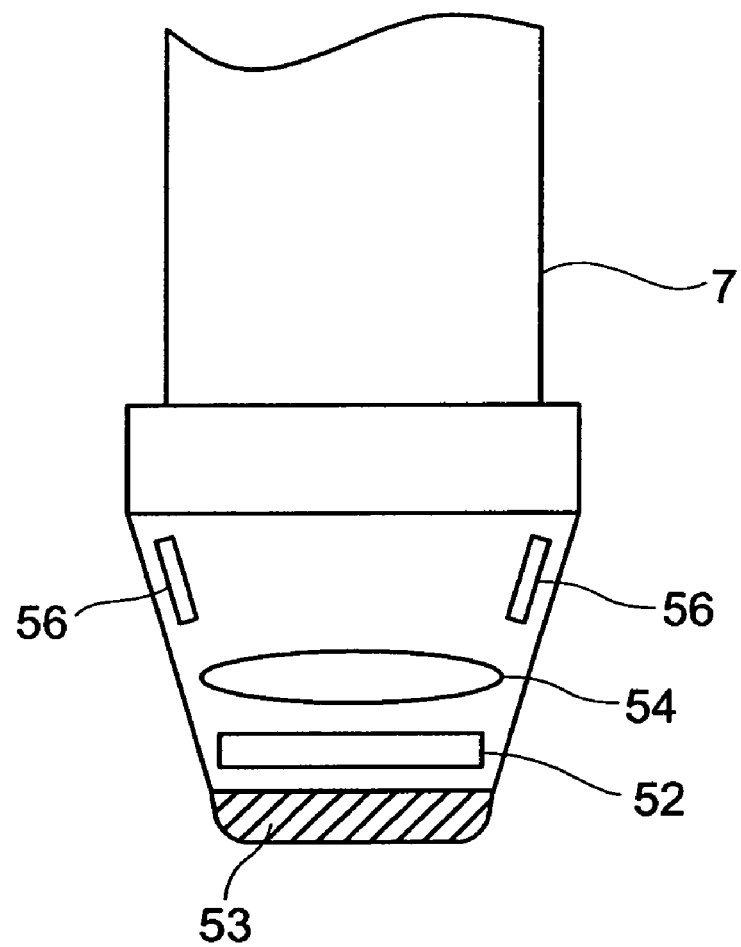
FIG. 9 is a configuration diagram showing a variation of the light supply unit of the embodiment.

It is noted that the light supply unit 3 may be provided with the filter 52, the fluorescent part 53, the lens 54, and the mirror 56. As shown in FIG. 9, the filter 52, the fluorescent part 53, the lens 54, and the mirror 56 may be located at the second end of the optical fiber 7.

The illumination system 1 of the configuration described above operates as follows. First, the remote-control signal receiver 57 of the illumination unit 5a (5b) receives an indication of lighting from the remote controller. The remote-control signal receiver 57 converts the indication from the remote controller into the indication signal S1 and sends it on a radio wave. The communicator 35 of the light supply unit 3 receives the indication signal S1 from the remote-control signal receiver 57, converts the indication signal S1 into the indication signal S2, and provides the indication signal S2 for the controller 31. Based on the indication signal S2, the controller 31 sends drive signals Sa-Sc (Se-Sg) to the light emitting devices 39a-39c (39e-39g). The light emitting devices 39a-39c (39e-39g) receive the drive signals Sa-Sc (Se-Sg) and emit the ultraviolet light. The ultraviolet light from the light emitting devices 39a-39c (39e-39g) is incident into first ends of the optical fibers 7 constituting the optical fiber group 7a (7b), and travels through the optical fibers 7 to reach the illumination unit 5a (5b). In the illumination unit 5a (5b), the fluorescent parts 53 are excited by the ultraviolet light from the light emitting devices 39a-39c (39e-39g), to generate the red light, green light, and blue light. Then these lights are mixed to yield white light and this white light is projected as illumination light to the outside of the illumination unit 5a (5b).

Thereafter, according to indications such as extinction, adjustment of illumination intensity, and an extinction time from the remote controller, the controller 31 adjusts the drive signals Sa-Sc (Se-Sg) by an operation similar to the above-described operation, to control the light emission (lighting intensity and lighting time) of the light emitting devices 39a-39c (39e-39g). The controller 31 also adjusts the light emission intensity of the light emitting devices 39a-39g so as to alleviate the total heat of the light emitting devices 39a-39g, based on required light intensities, continuous operation times, power consumptions, etc. of the respective light emitting devices 39a-39g.

The illumination system 1, the light supply unit 3, and the illumination units 5a and 5b according to the present embodiment described above have the following effects. Specifically, the light supply unit 3 according to the present embodiment permits the plurality of light emitting devices 39a-39g, which provide the light for the two illumination units 5a and 5b, to be housed in one main body 30. Since the main body 30, which includes the plurality of light emitting devices 39a-39g, is separated through the optical fibers 7 from the illumination units 5a and 5b, the light supply unit 3 has higher degrees of freedom for arrangement of the light emitting devices 39a-39g than the conventional illumination apparatus, and permits the light emitting devices 39a-39g to be arranged with any required separation between them. In addition, the heat from the plurality of light emitting devices 39a-39g for providing the light for the two illumination units 5a and 5b can be radiated together through the radiator plate 43. Accordingly, the light supply unit 3 of the present embodiment enables efficient radiation of the heat generated in the light emitting devices 39a-39g. In the light supply unit 3 of the present embodiment, the controller 31 collectively controls the light emission of the respective light emitting devices 39a-39g, and it is thus feasible to efficiently adjust the illumination intensities in the illumination units 5a and 5b.

Since the light supply unit 3 of the present embodiment is arranged to supply the light to each illumination position, no large current flows through wire, so as to eliminate concerns about troubles such as a short circuit. Since the light supply unit 3 can be placed irrespective of the illumination positions, the light supply unit 3 can be installed at a preferred place such as a well-ventilated place. Since the light supply unit 3 is provided with the light emitting devices 39a-39g, the illumination units 5a and 5b do not have to be equipped with facilities such as a control circuit and a power supply. For example, the conventional illumination apparatus shown in FIG. 1 needs to have drive and control circuits such as an AC/DC converter and a switch for driving the light emitting devices. According to the light supply unit 3 of the present embodiment, these functions all are housed in the light supply unit 3, whereby it is feasible to produce the illumination units 5a and 5b light in weight and low in cost, to enhance degrees of freedom for light distribution design and exterior design, and to facilitate maintenance and management. Particularly, in cases where a lot of small illumination lights, such as guide lights to audience seats in a movie theater, and security lights in a building, are installed, the light supply unit 3 of the present invention can be suitably applied with the control circuit for each of the illumination lights together, which is economical. If one is bored with the design of the illumination units 5a and 5b, the illumination units 5a and 5b only will be replaced simply with other units. Since the illumination units 5a and 5b include no light emitting device, they are readily recycled.

The light supply unit 3, as in the present embodiment, is preferably provided with the converter 33 electrically connected to the controller 31 and configured to convert the AC power P1 supplied from the outside, into the DC power P2 and to supply the DC power P2 to the controller 31. This permits the light supply unit 3 to be suitably used in buildings and others under supply of the AC power.

The light supply unit 3, as in the present embodiment, is preferably provided with the communicator 35 electrically connected to the controller 31 and configured to receive the indication signal S1 for indication of the light emission of the light emitting devices 39a-39g from the outside and to provide the indication signal for the controller 31. This makes it feasible to suitably provide the indication such as the light emission intensity to the light supply unit 3 from a place (e.g., the illumination position) distant from the light supply unit 3.

The light emitting devices 39a-39g are preferably the ultraviolet LEDs or LDs as in the present embodiment. For example, where white LEDs are used as the light emitting devices 39*a*-39*g*, amounts of absorption of light in the optical fibers 7 differ depending upon wavelengths because of dispersion in the optical fibers 7, and the illumination color in the illumination unit 5*a* (5*b*) is slightly different from the emission color in the light emitting devices 39*a*-39*g*. In addition, the length of the optical fibers 7 to the illumination unit 5*a* is different from the length of the optical fibers 7 to the illumination unit 5*b*, whereby the illumination colors in the respective illumination units differ from each other. Therefore, the illumination color as expected can be obtained in the illumination units 5*a* and 5*b* by adopting the configuration wherein the monochromatic light from the ultraviolet LEDs (or the ultraviolet LDs) is fed through the optical fibers 7 to the illumination units 5*a* and 5*b* and wherein it is converted into white light by the fluorescent parts 53, as in the light supply unit 3 of the present embodiment. This effect is also achieved similarly by use of the blue LEDs or LDs, as well as the ultraviolet LEDs or LDs. The white LEDs or LDs may also be used in cases where the length of optical fibers 7 is relatively short.

The illumination units 5*a* and 5*b*, as in the present embodiment, are preferably provided with the fluorescent parts 53 optically coupled to the second ends of the optical fibers 7 and excited by the ultraviolet light or blue light from the light emitting devices 39*a*-39*g* to emit visible light of the longer wavelength than the ultraviolet light or blue light. This permits a predetermined illumination color to be obtained, for example, through mixing with the visible light from the fluorescent parts 53 excited by the ultraviolet light or blue light from the light emitting devices 39*a*-39*g*. Since the illumination units 5*a* and 5*b* are located apart from the main body 30 of the light supply unit 3, the fluorescent parts 53 are separated from the light emitting devices 39*a*-39*g*, and thus the fluorescent parts 53 are free of influence of the heat from the light emitting devices 39*a*-39*g*. Therefore, it is feasible to suppress deterioration of the fluorescent parts 53 (reduction in transmittance and in emission efficiency) and to enhance the lifetime and reliability.

The illumination system 1 of the present embodiment is equipped with the light supply unit 3, and two illumination units 5*a* and 5*b* located at their respective illumination positions different from each other. This provides the illumination system capable of efficiently adjusting the illumination intensities at the two illumination positions and capable of efficiently radiating the heat of the light emitting devices 39*a*-39*g*.

First Modified Embodiment

Figure 10:
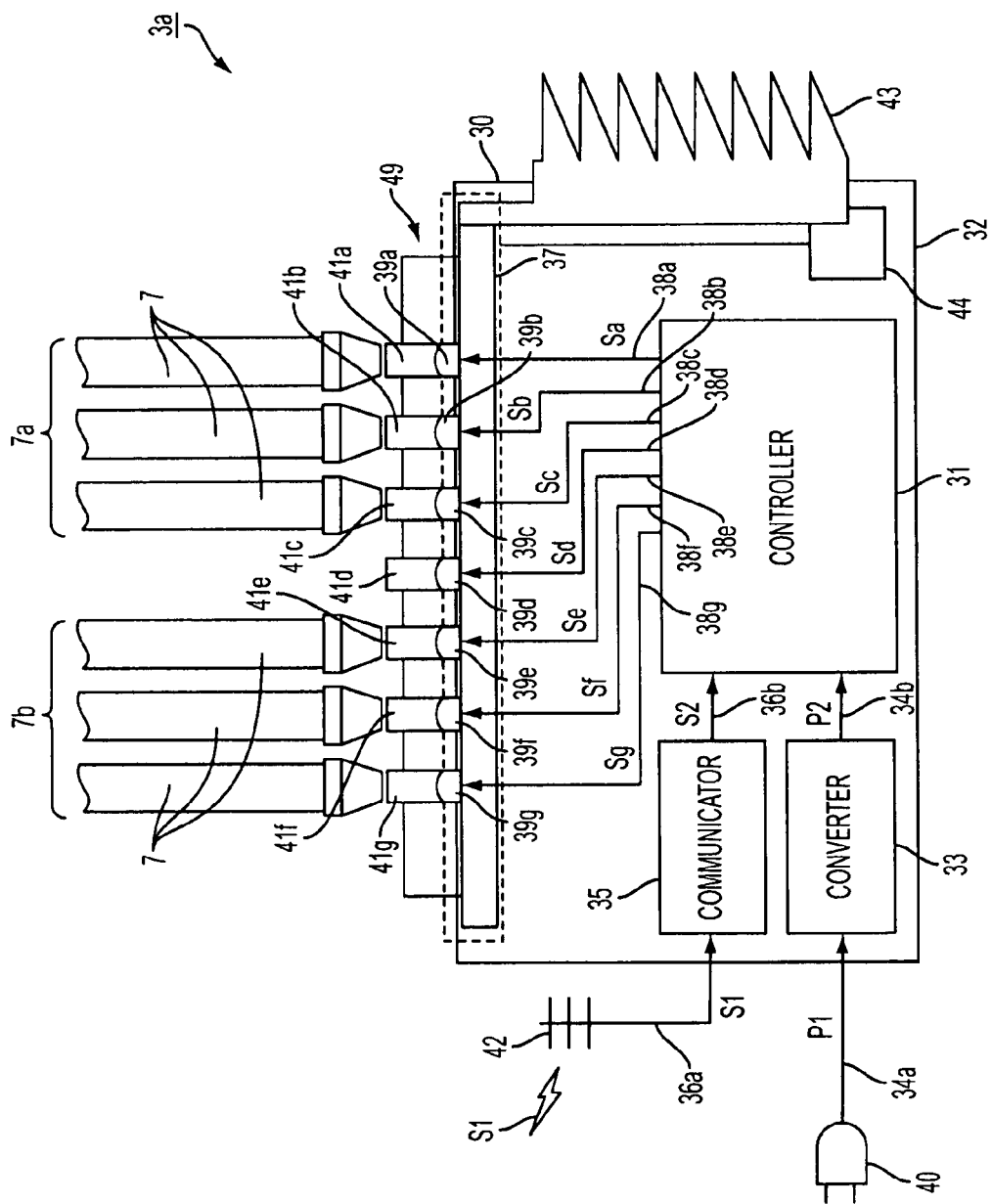
FIG. 10 is a configuration diagram showing a first modified embodiment of the light supply unit according to the present invention.

FIG. 10 is a configuration diagram showing a first modified embodiment of the light supply unit 3 of the above-described embodiment. With reference to FIG. 10, the light supply unit 3*a* of the present modified embodiment is further provided with a cooling device 44, in addition to the configuration of the light supply unit 3 of the above embodiment. The cooling device 44 is a device for cooling the light emitting devices 39*a*-39*g*, and adopts, for example, an air cooling or water cooling system. In the present modified embodiment the cooling device 44 is contained in the housing 32 and connected to the substrate 37. When the light supply unit 3 is provided with the cooling device 44 as in this configuration, the unit is able to more efficiently radiate the heat generated in the light emitting devices 39*a*-39*g*.

Second Modified Embodiment

Figure 11:
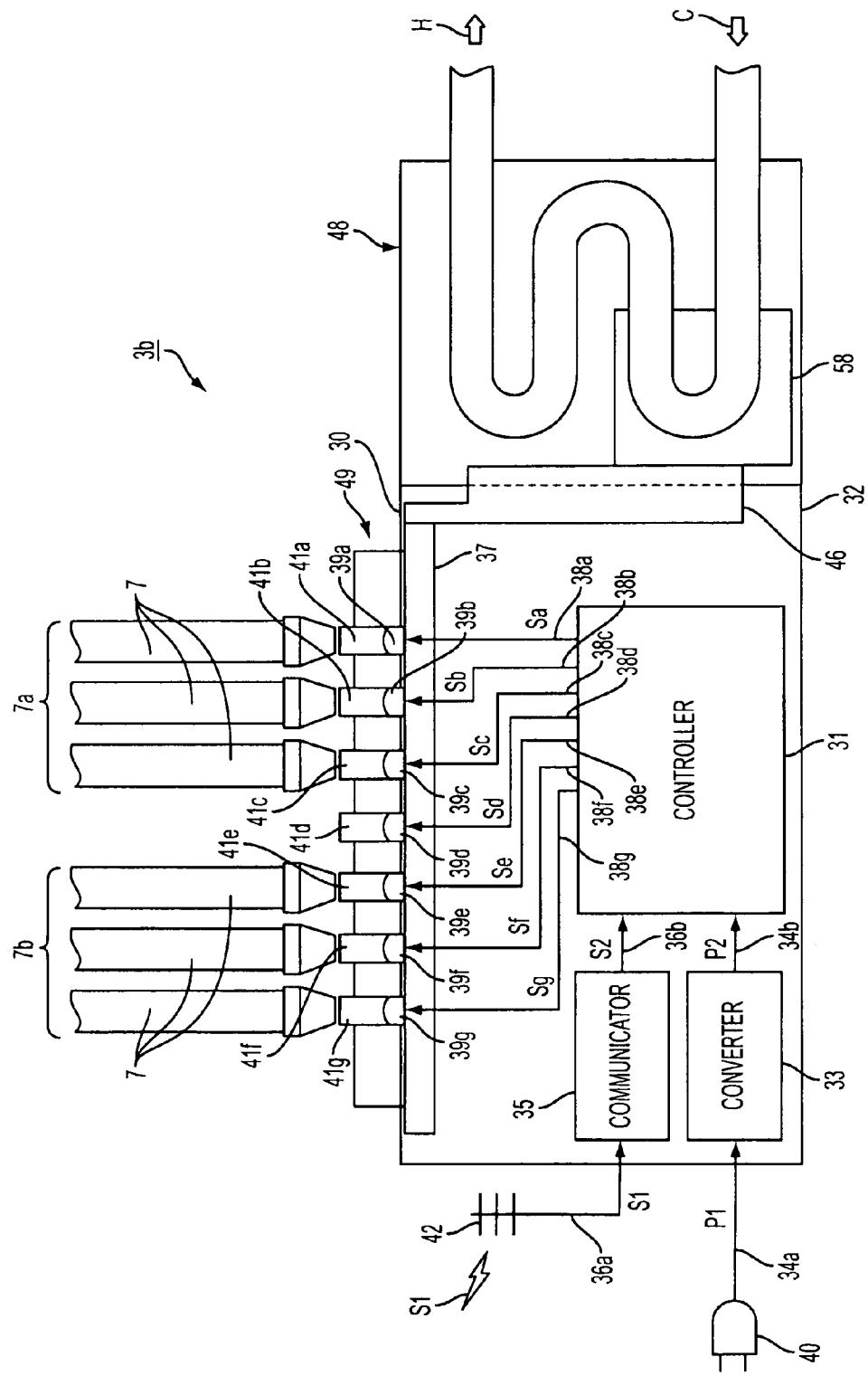
FIG. 11 is a configuration diagram showing a second modified embodiment of the light supply unit according to the present invention.

FIG. 11 is a configuration diagram showing a second modified embodiment of the light supply unit 3 of the above-described embodiment. With reference to FIG. 11, the light supply unit 3*b* of the present modified embodiment is further provided with a water heater 48, in addition to the configuration of the light supply unit 3 of the aforementioned embodiment. The water heater 48 is preferably contained in the housing 32. The water heater 48 is a device for heating water by the heat from the light emitting devices 39*a*-39*g*. The light supply unit 3*b* of the present modified embodiment is provided with a radiator plate 46 instead of the radiator plate 43 of the aforementioned embodiment. The radiator plate 46 provides the water heater 48 the heat transmitted through the substrate 37 from the light emitting devices 39*a*-39*g*. The water heater 48 heats cool water C flowing in a tube, by the heat from the radiator plate 46, and supplies hot water H to the outside. When the light supply unit 3*b* is provided with the water heater 48 as in this configuration, the heat of the light emitting devices 39*a*-39*g* can be suitably reused. Methods of reusing the heat of the light emitting devices 39*a*-39*g* are not limited to the water heater 48, but it is also possible to use the heat of the light emitting devices 39*a*-39*g*, for example, for heating or the like by use of a heat accumulator 58 having a heat accumulation material such as paraffin. The heat accumulator 58 is preferably contained in the housing 32.

Third Modified Embodiment

Figure 12:
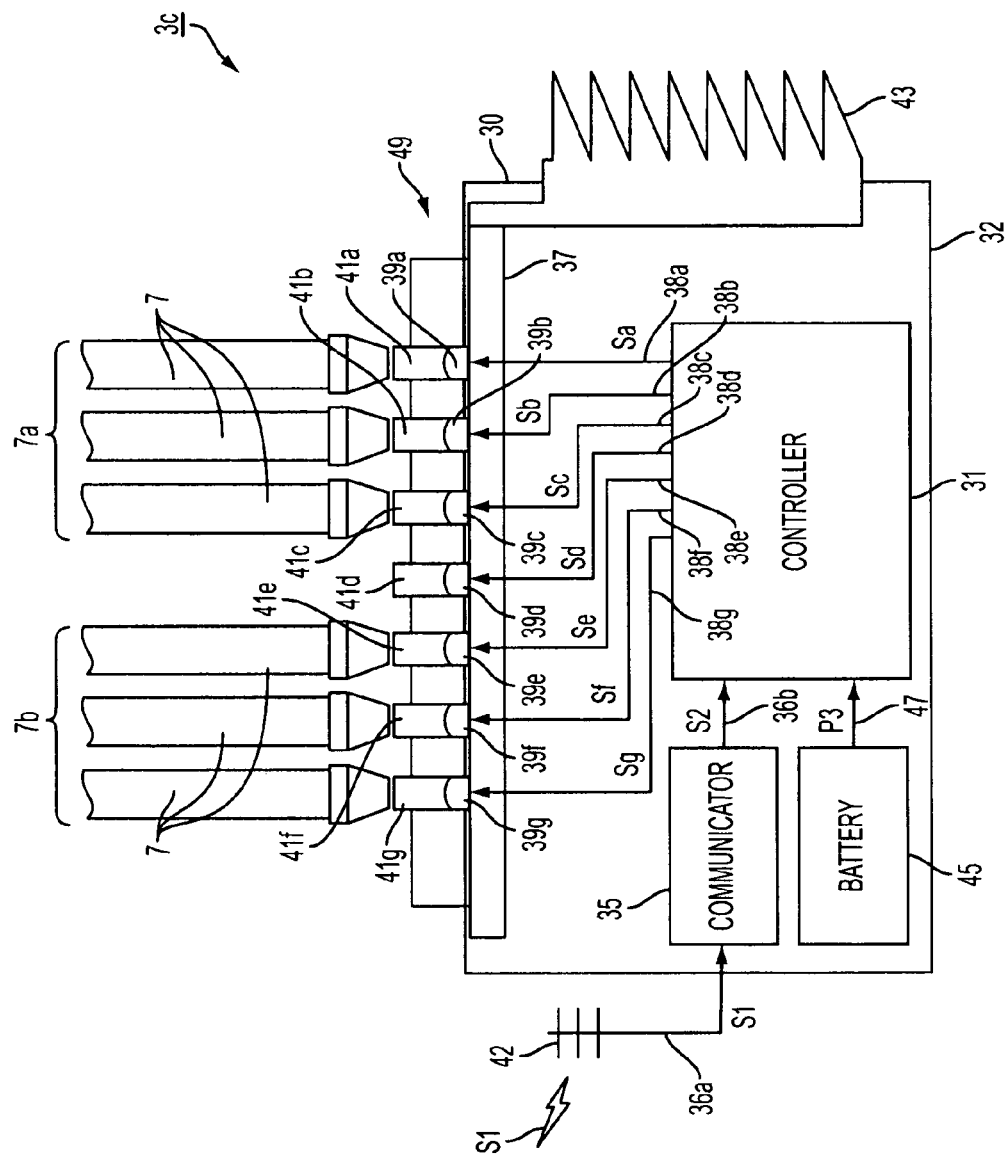
FIG. 12 is a configuration diagram showing a third modified embodiment of the light supply unit according to the present invention.

FIG. 12 is a configuration diagram showing a third modified embodiment of the light supply unit 3 of the aforementioned embodiment. With reference to FIG. 12, the light supply unit 3*c* of the present modified embodiment is provided with a battery 45, instead of the converter 33 and plug 40 of the aforementioned embodiment. The battery 45 is electrically connected through wire 47 to the controller 31 and supplies a DC power P3 for driving of the light emitting devices 39*a*-39*g*, to the controller 31. The battery 45 is preferably contained in the housing 32. The battery 45 can be selected, for example, from rechargeable storage cells (batteries) and dry cells. When the light supply unit 3*c* is provided with the battery 45 as in this configuration, it becomes feasible to readily equip a moving object with the light supply unit 3*c*. Furthermore, it also becomes feasible to carry the light supply unit 3*c* if it is constructed in relatively small size.

Fourth Modified Embodiment

Figure 13:
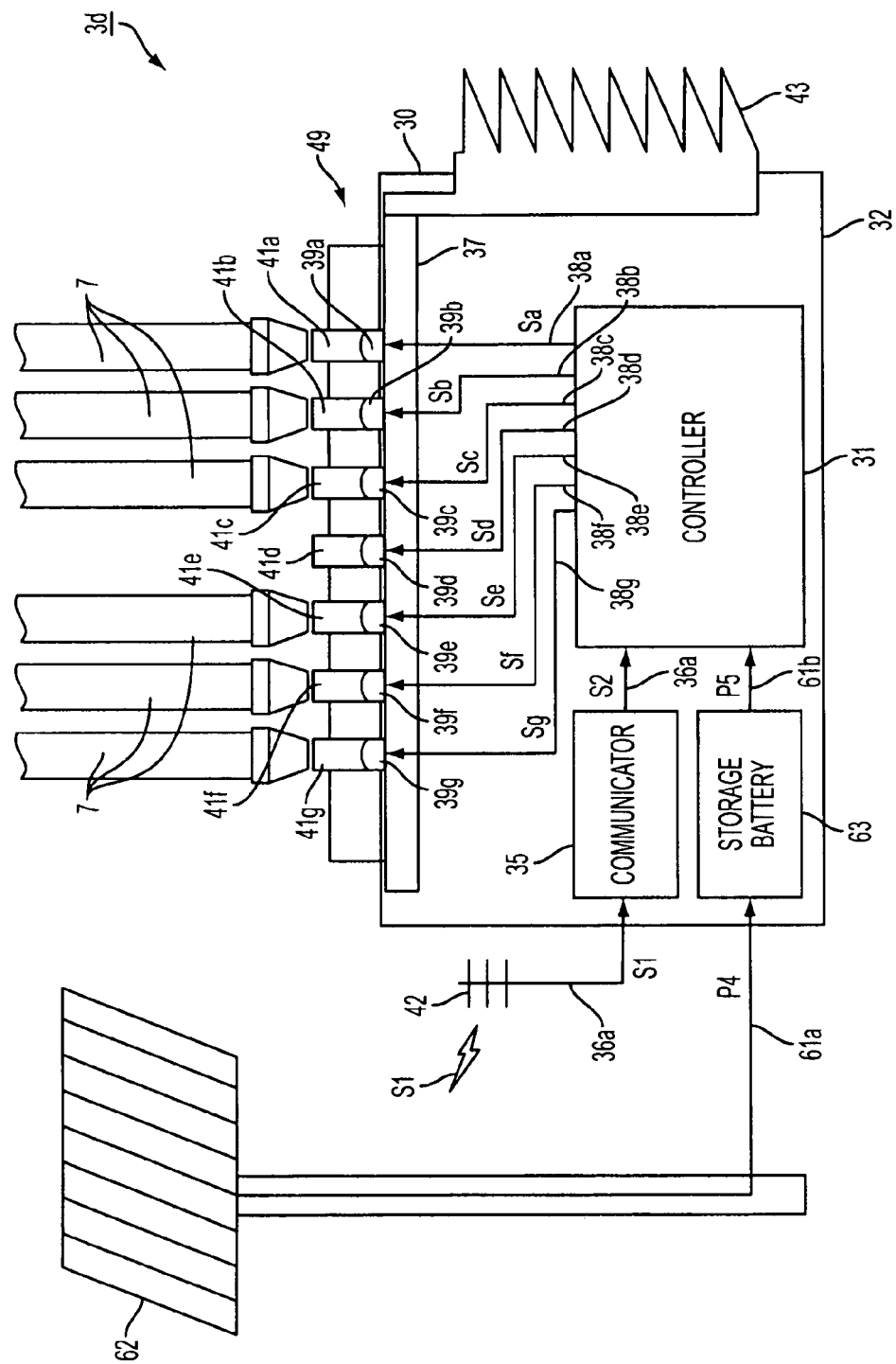
FIG. 13 is a configuration diagram showing a fourth modified embodiment of the light supply unit according to the present invention.

FIG. 13 is a configuration diagram showing a fourth modified embodiment of the light supply unit 3 of the aforementioned embodiment. With reference to FIG. 13, the light supply unit 3*d* of the present modified embodiment is equipped with a storage battery 63, instead of the converter 33 and plug 40 of the aforementioned embodiment. The light supply unit 3*d* of the present modified embodiment is further provided with a solar cell 62. The storage battery 63 is preferably contained in the housing 32. The storage battery 63 is electrically connected through wire 61*a* to the solar cell 62 and is also electrically connected through wire 61*b* to the controller 31. The solar cell 62 receives sunlight to generate power P4, and supplies the power P4 through wire 61*a* to the storage battery 63. The storage battery 63 is charged by the power P4 from the solar cell 62. The storage battery 63 supplies a supply voltage P5 for driving the light emitting devices 39*a*-39*g*, to the controller 31. When the light supply unit 3*d* is equipped with the solar cell 62 and storage battery 63 as in this configuration, the unit can semipermanently operate without supply of power from the outside.

Fifth Modified Embodiment

Figure 14:
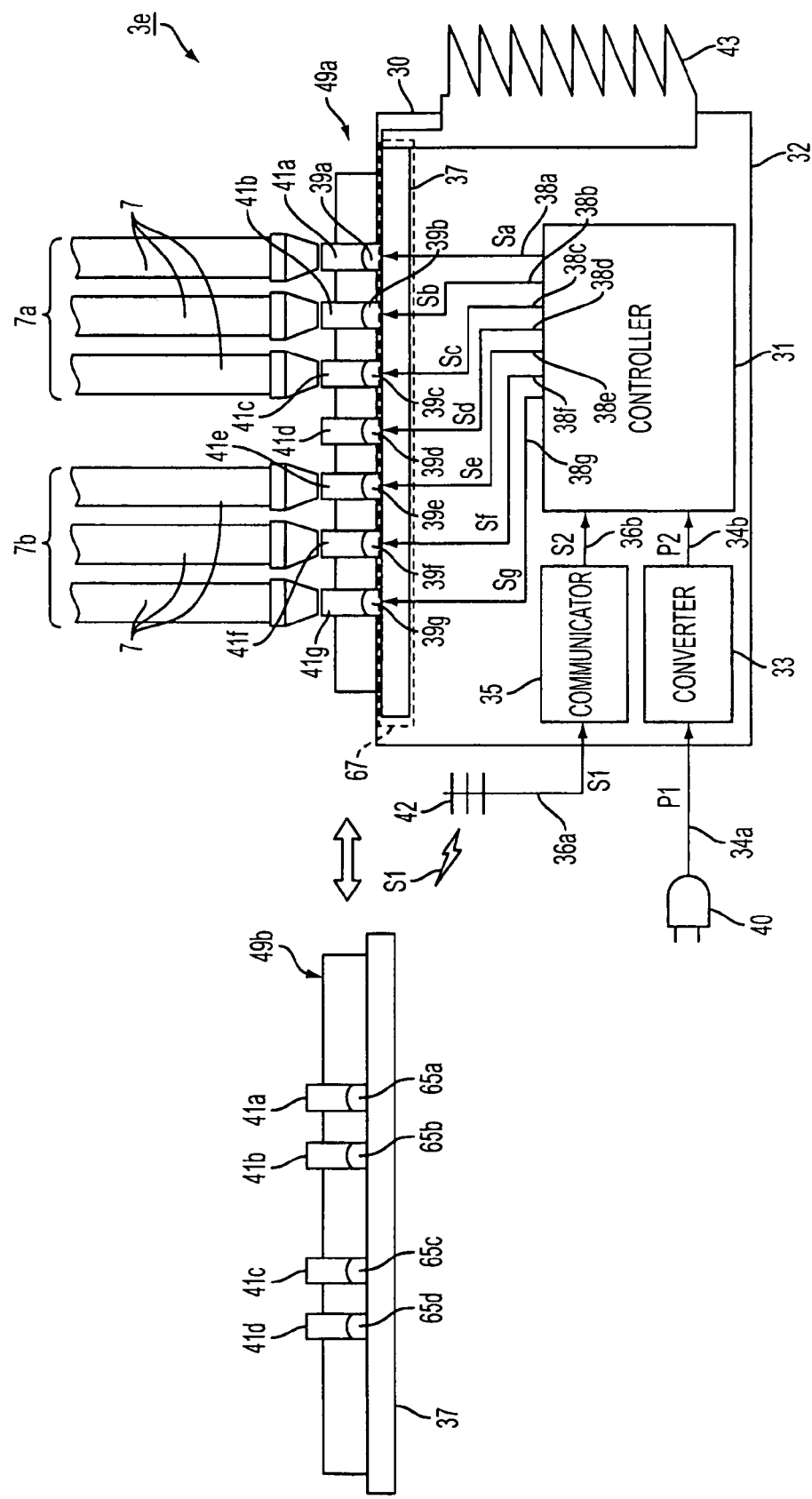
FIG. 14 is a configuration diagram showing a fifth modified embodiment of the light supply unit according to the present invention.

FIG. 14 is a configuration diagram showing a fifth modified embodiment of the light supply unit 3 of the aforementioned embodiment. With reference to FIG. 14, the light supply unit 3e of the present modified embodiment is further provided with a slot 67, in addition to the configuration of the aforementioned embodiment. The light supply unit 3e is equipped with a plurality of modules 49a and 49b. The slot 67 is contained in the housing 32. The slot 67 detachably holds the substrate 37 of the module 49a or 49b, so that the module 49a and the module 49b can be replaced with each other. In the present modified embodiment the module 49a has the same configuration as the module 49 of the aforementioned embodiment. The module 49b has four light emitting devices 65a-65d, instead of the light emitting devices 39a-39g of the module 49 of the aforementioned embodiment. The light emitting devices 65a-65d are, for example, LEDs or LDs with a different emission wavelength from that of the light emitting devices 39a-39g; the light emitting devices 65a and 65b correspond to the optical fiber group 7a and the light emitting devices 65c and 65d correspond to the optical fiber group 7b.

When the light supply unit 3e is provided with the slot 67 as in this configuration, it becomes feasible to replace the module with another different in the number of light emitting devices, arrangement of light emitting devices, the emission wavelength, or the like in accordance with need or preference. When the unit is provided with a plurality of slots 67, it becomes easy to provide the unit with extensibility, e.g., increase in the number of light emitting devices.

FIRST EXAMPLE

Figure 15:
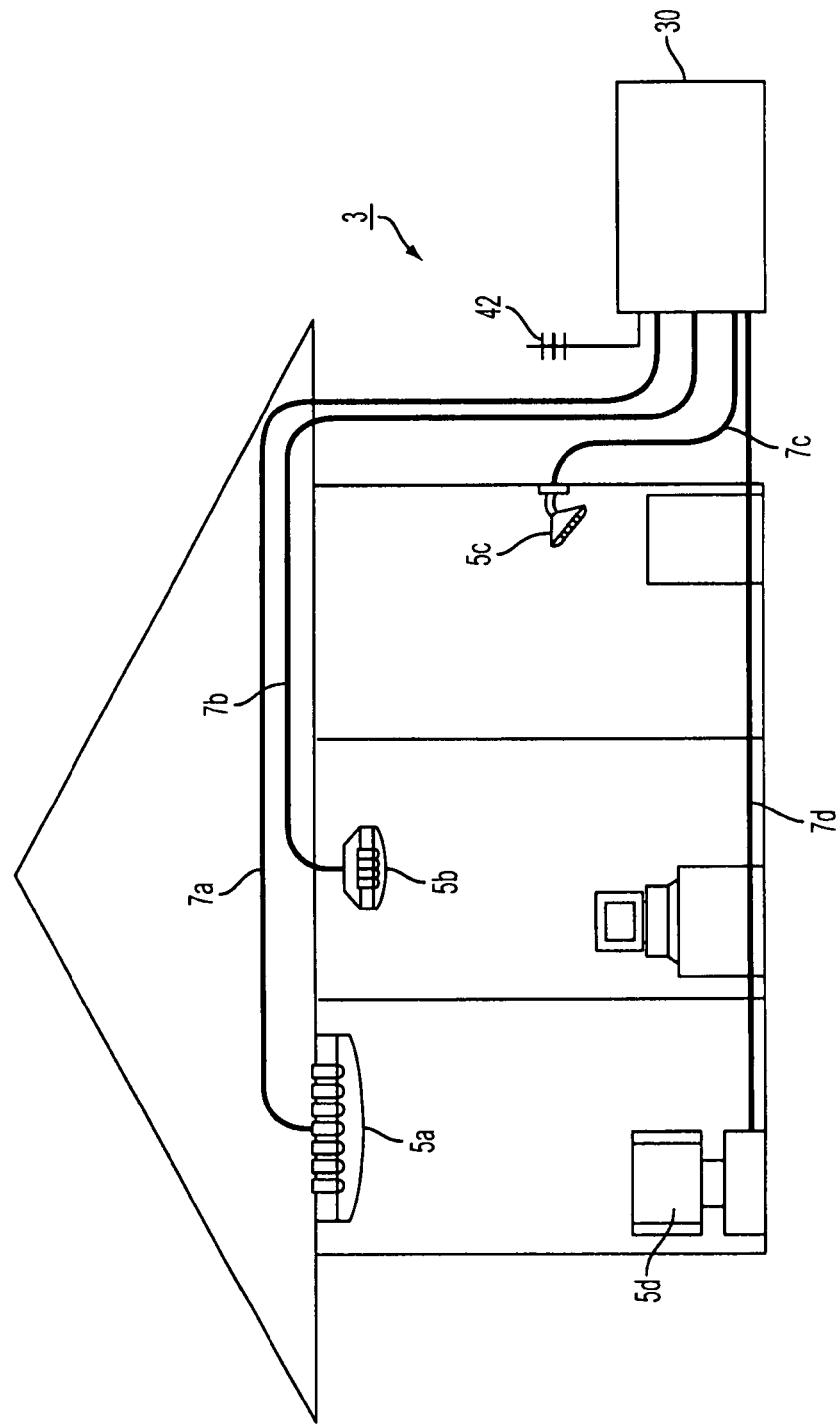
FIG. 15 is an illustration showing a first example of the illumination system according to the present invention.

FIG. 15 is an illustration showing a first example of the illumination system according to the aforementioned embodiment and modified embodiments. As shown in FIG. 15, the illumination system can be used as illumination apparatus in a house. In the present example, the light supply unit 3 is further provided with optical fiber groups 7c and 7d, in addition to the optical fiber groups 7a and 7b. The illumination system of the present example is further provided with illumination units 5c and 5d, in addition to the illumination units 5a and 5b. In the present example, the main body 30 is located outdoors. The illumination units 5a-5c are placed on the ceiling or on the wall surface so as to illuminate the interior. The illumination unit 5d is used as a backlight of a liquid crystal display.

SECOND EXAMPLE

Figure 16:
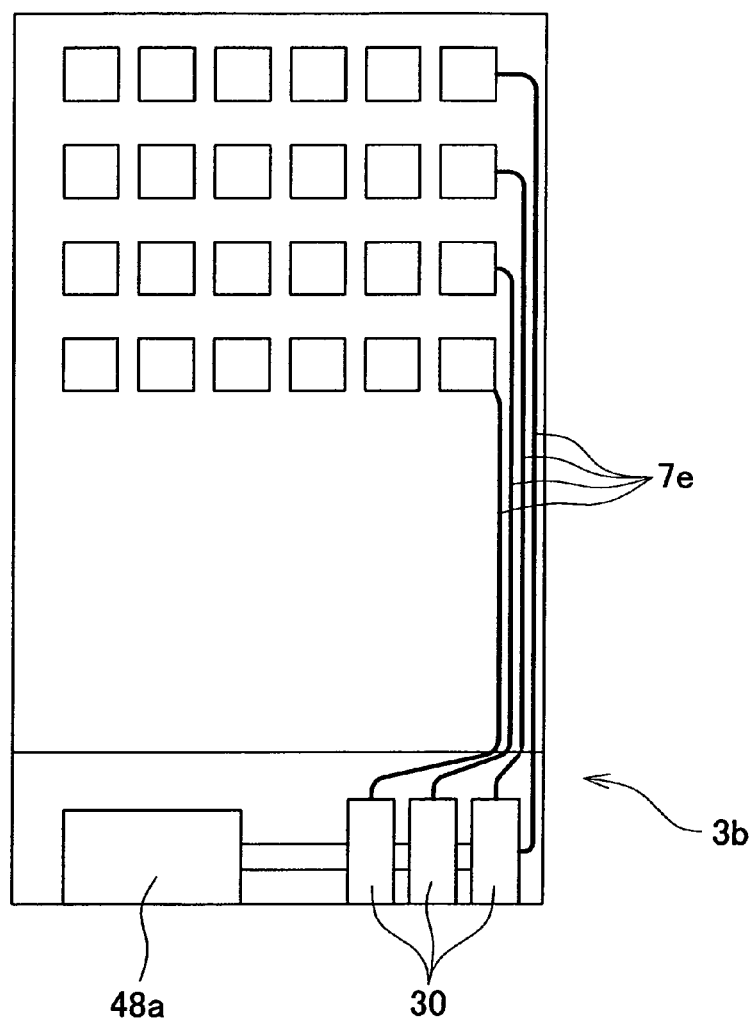
FIG. 16 is an illustration showing a second example of the illumination system according to the present invention.

FIG. 16 is an illustration showing a second example of the illumination system according to the aforementioned embodiment and modified embodiments. As shown in FIG. 16, the illumination system according to the aforementioned embodiment and modified embodiments can be used as illumination apparatus for each house in a housing complex such as a condominium building. In the present example, the illumination system is equipped with a plurality of light supply units 3b of the second modified embodiment described above. An optical fiber bundle 7e extends from the main body 30 of each light supply unit 3b to each house. The optical fiber bundle 7e includes optical fiber groups each extending to at least two houses (six houses in the present modified embodiment). Illumination units different in purpose and shape are used in the respective houses, and these illumination units are controlled centrally by the light supply units 3b. The light supply units 3b are preferably controlled by radio communication from each house.

A pipe extending from water heaters 48 (cf. FIG. 11) of the light supply units 3b is connected to a hot water tank 48a. The above-described illumination system as in this example is able to efficiently reuse the heat generated by illumination of each house in the housing complex.

THIRD EXAMPLE

Figure 17:
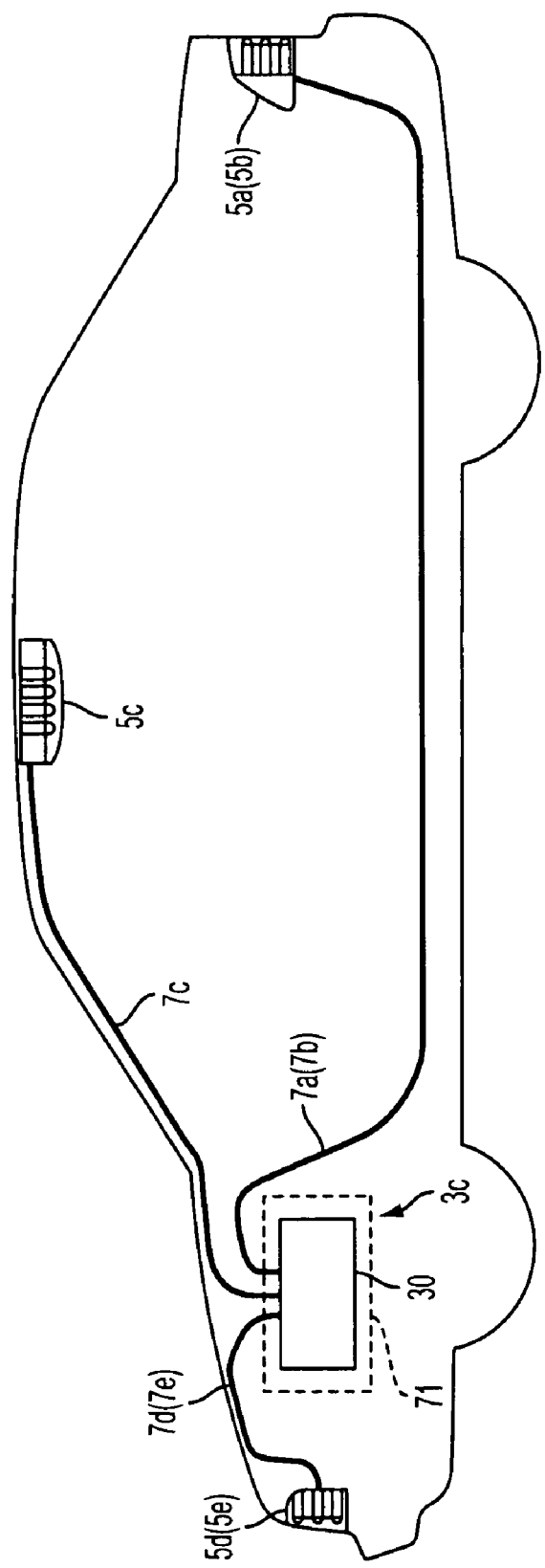
FIG. 17 is an illustration showing a third example of the illumination system according to the present invention.

FIG. 17 is an illustration showing a third example of the illumination system according to the aforementioned embodiment and modified embodiments. As shown in FIG. 17, the illumination system can be used as illumination apparatus for a vehicle such as a car. In the present example, the illumination system is equipped with the light supply unit 3c of the third modified embodiment described above. Specifically, the light supply unit 3c of the present example receives supply of power from a battery mounted on the vehicle. The light supply unit 3c of the present example is cooled by a cooling device 71. The cooling device 71 can be, for example, a radiator of a car. The light supply unit 3c is provided with optical fiber groups 7a-7e extending from the main body 30 to illumination units 5a-5e. These optical fiber groups 7a-7e may be integrally constructed as an optical harness. The illumination units 5a and 5b are arranged as left and right taillights. The illumination unit 5c is arranged as an interior light. The illumination units 5d and 5e are arranged as left and right headlights.

In the present example, the optical fiber groups 7d and 7e extending to the illumination units 5d and 5e (headlights) are arranged in a high-temperature engine room and thus are preferably optical fibers with high heat resistance according to need.

Where the above illumination system is mounted on a vehicle such as a car as in the present example, it becomes feasible to efficiently adjust the light intensities of the two headlights, the interior light, and the taillights. In general the headlights are housed in narrow spaces where heat radiation is poor. To the contrary, the present example achieves efficient radiation of the heat generated by illumination of the headlights, interior light, and taillights, by the cooling device such as the radiator.

FOURTH EXAMPLE

Figure 18:
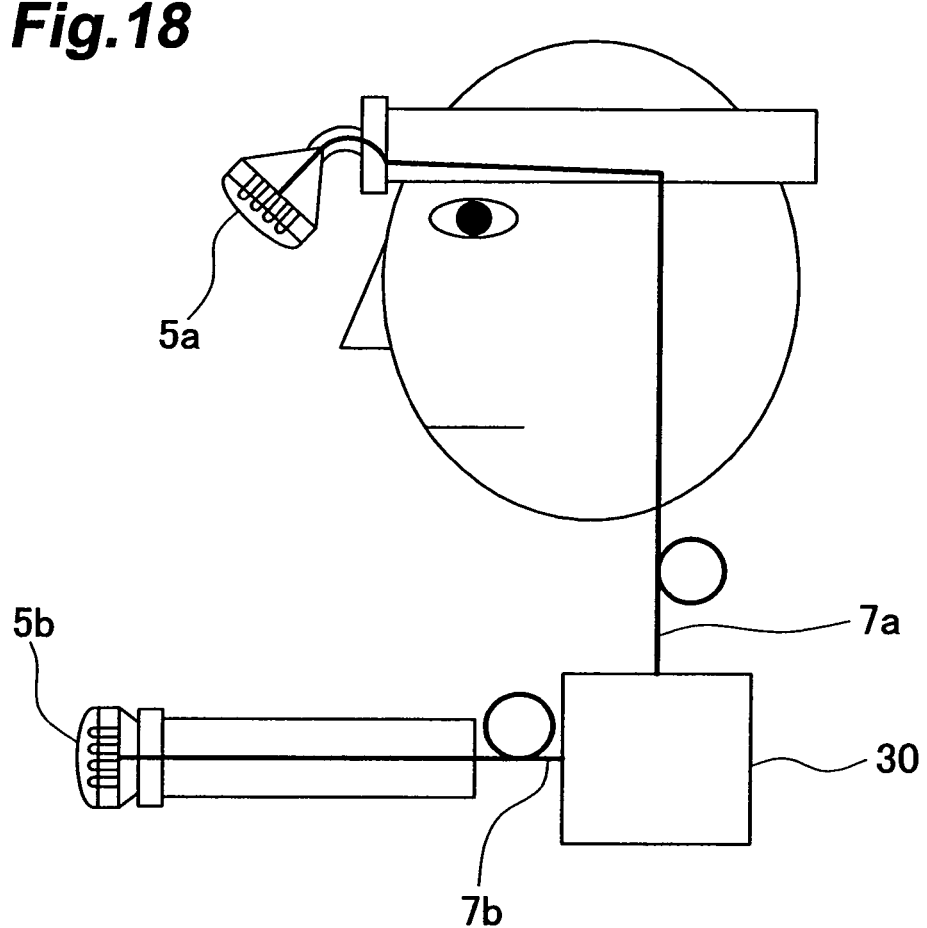
FIG. 18 is an illustration showing a fourth example of the illumination system according to the present invention.

FIG. 18 is an illustration showing a fourth example of the illumination system according to the aforementioned embodiment and modified embodiments. As shown in FIG. 18, the illumination system can be used as portable illumination apparatus. In the present example the illumination system is equipped with the light supply unit 3c of the third modified embodiment described above. Namely, the light supply unit 3c is equipped with the battery 45 (cf. FIG. 12). The light supply unit 3c is provided with the optical fiber groups 7a and 7b extending from the main body 30 to the illumination units 5a and 5b. In the present example the illumination unit 5a is arranged as a head lamp. The illumination unit 5b is arranged as a flashlight.

FIFTH EXAMPLE

Figure 19:
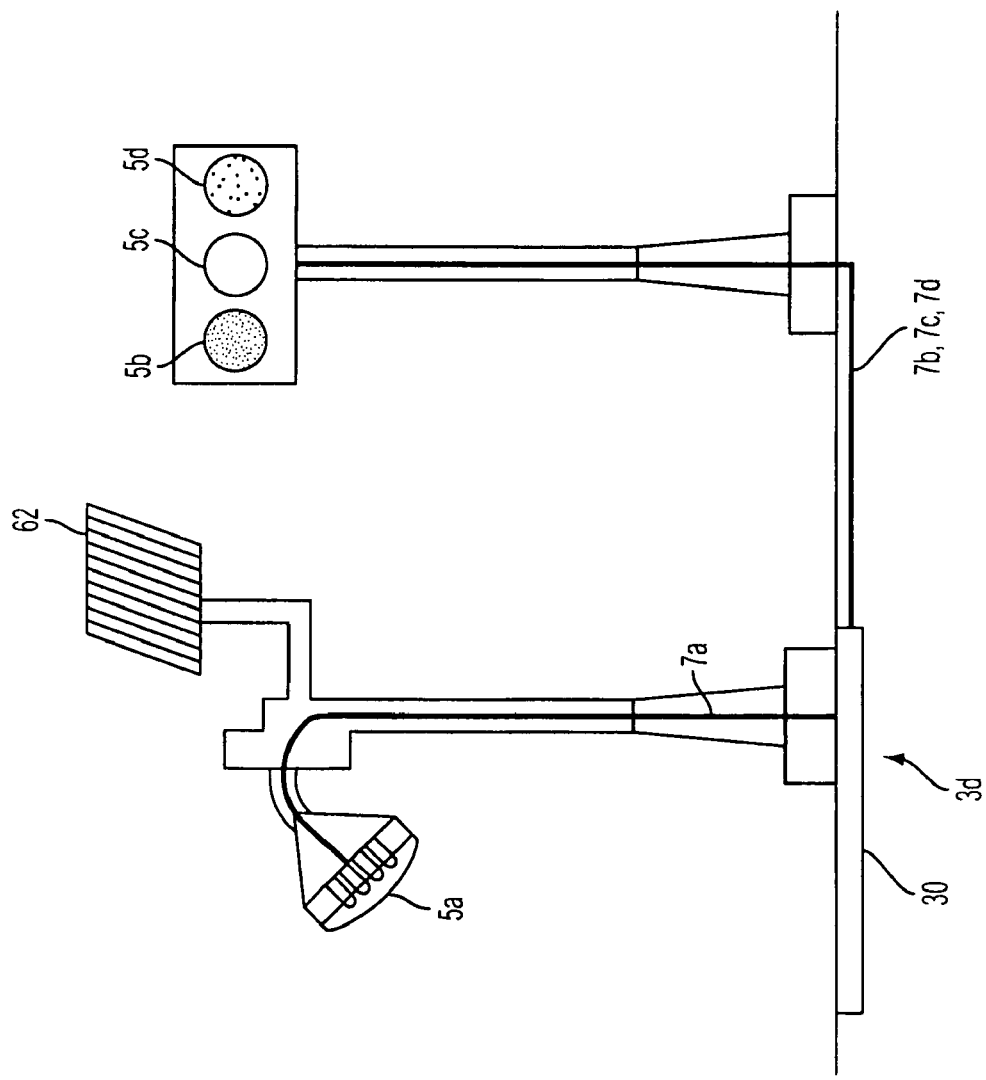
FIG. 19 is an illustration showing a fifth example of the illumination system according to the present invention.

FIG. 19 is an illustration showing a fifth example of the illumination system according to the aforementioned embodiment and modified embodiments. As shown in FIG.

19, the illumination system can be used as street lamps and traffic signals. In the present example the illumination system is equipped with the light supply unit 3*d* of the fourth modified embodiment described above. Namely, the light supply unit 3*d* is provided with the solar cell 62 and storage battery (cf. FIG. 13), and is configured to store power during the day. The main body 30 of the light supply unit 3*d* is buried in the ground so as not to impede traffic. The light supply unit 3*d* is provided with optical fiber groups 7*a*-7*d* extending from the main body 30 to illumination units 5*a*-5*d*. In the present example the illumination unit 5*a* is arranged as a street lamp. The illumination units 5*b*-5*d* are arranged as a blue lamp, a yellow lamp, and a red lamp of a traffic signal.

SIXTH EXAMPLE

Figure 20:
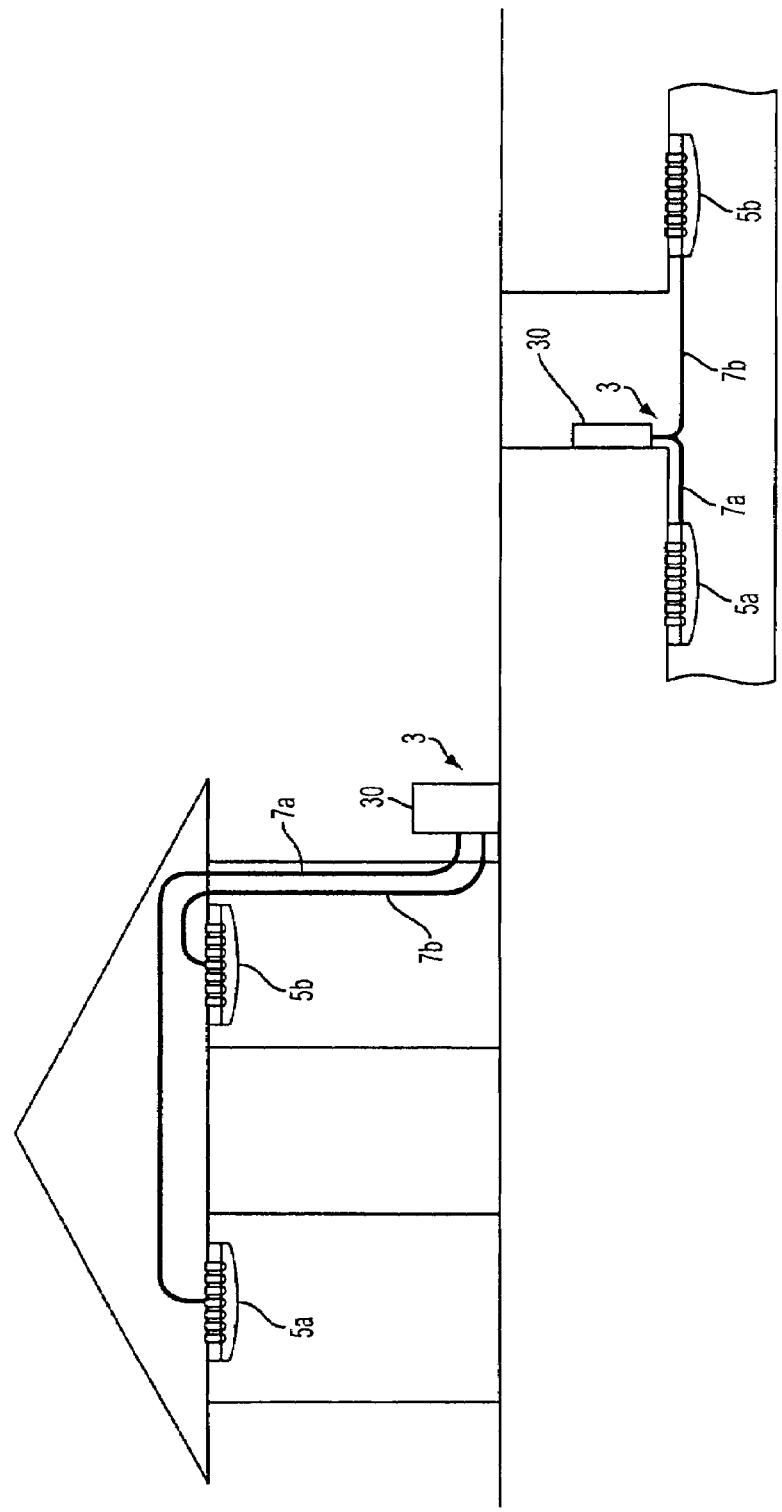
FIG. 20 is an illustration showing a sixth example of the illumination system according to the present invention.

FIG. 20 is an illustration showing a sixth example of the illumination system according to the aforementioned embodiment and modified embodiments. As shown in FIG. 20, the illumination system can be used as illumination for an attic of a house and as illumination for an underground utility room. The present illumination system permitting free arrangement of the main body 30 of the light supply unit 3 is suitably used at narrow ill-ventilated places like the attic and utility room. Specifically, the main body 30 is located at a well-ventilated place, e.g., outdoors or in a ventilation hole, whereby the heat generated from the light emitting devices can be properly radiated. The illumination units 5*a* and 5*b* are compact because of no need for the power source, the control circuit, etc., and thus can be suitably installed even at a narrow place. The optical fiber groups extending to the narrow places such as the attic and utility room can be thin optical fiber cables like the under carpet type that can be laid through a narrow space.

SEVENTH EXAMPLE

Figure 21:
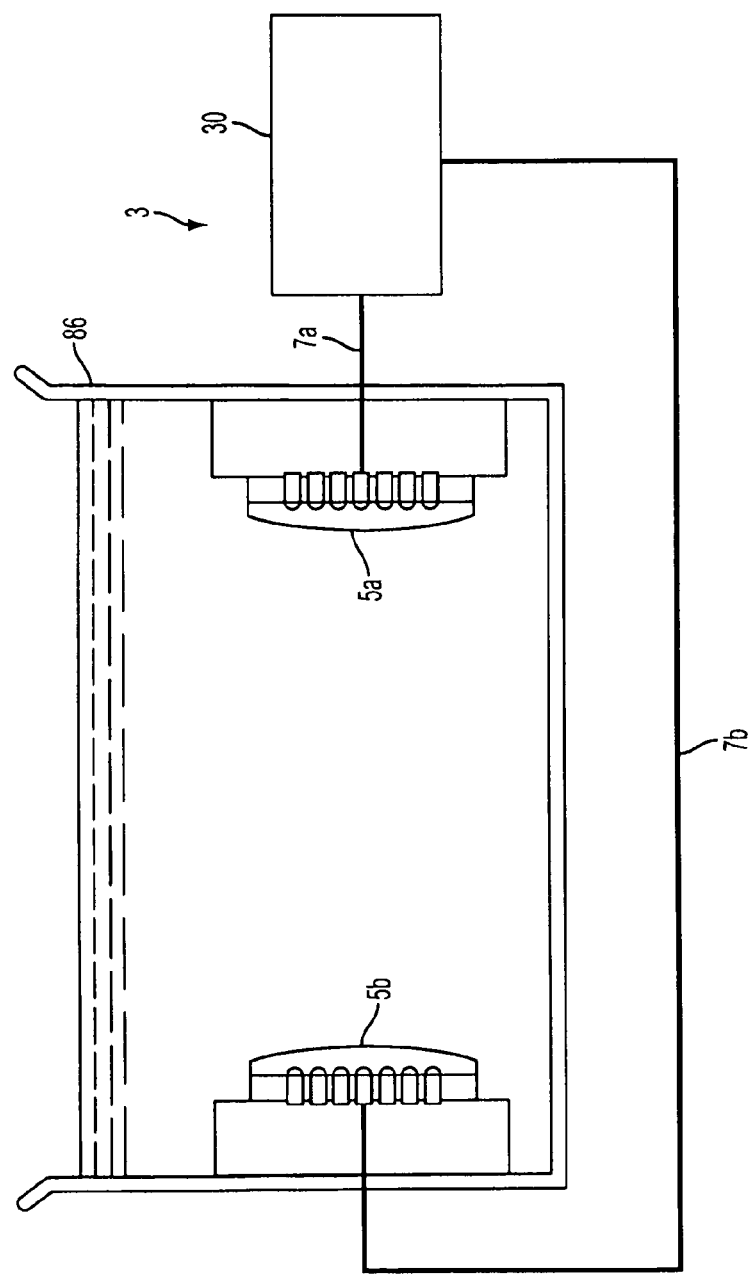
FIG. 21 is an illustration showing a seventh example of the illumination system according to the present invention.

FIG. 21 is an illustration showing a seventh example of the illumination system according to the aforementioned embodiment and modified embodiments. As shown in FIG. 21, the illumination system can be used as illumination apparatus for a water tank. In the present example, the illumination units 5*a* and 5*b* are located in the water tank 86. The main body 30 of the light supply unit 3 is located outside the water tank 86. Since the illumination units 5*a* and 5*b* according to the foregoing embodiment and modified embodiments do not have to be equipped with the electric circuit and the power supply, they have relatively high water resistance and thus require no special waterproof equipment. For illuminating the interior of the water tank 86 as in the present example, therefore, the illumination units 5*a* and 5*b* are placed inside the water tank 86 to achieve appropriate illumination. In cases where the optical fiber group 7*a* or 7*b* is brought into contact with water, the optical fibers to be used can be those with high water resistance.

Without being restricted to the above-mentioned embodiments, the present invention can be modified in various manners. For example, the foregoing embodiment and examples adopted the configuration wherein each illumination unit had the radiowave output terminal to send the indication signal to the light supply unit by radio. The transmission method of the indication signal-does not have to be limited to this. It is also possible to transmit the indication signal as an optical signal through a communication optical fiber connecting the illumination unit to the light supply unit. It is also possible to transmit the indication signal as an electric signal through a communication line connecting the illumination unit with the light supply unit. Another potential way is to transmit the indication signal directly from a remote controller or a personal computer to the light supply unit. Particularly, use of the personal computer facilitates adjustment of light distribution through adjustment of light intensity balance of the semiconductor light emitting devices, or the energy saving operation through temporal control of the light intensity and on/off.

In the aforementioned embodiment and examples, the LEDs and LDs were exemplified as the semiconductor light emitting devices of the light supply unit, but the semiconductor light emitting devices can be any other devices.

The controller of the light supply unit is preferably provided with the CPU and memory. But it is also possible to adopt a configuration wherein a computer disposed outside the light supply unit is arranged to transmit and receive signals to and from the controller in the light supply unit, and wherein the computer performs part of the control on the light emitting states of the semiconductor light emitting devices.

What is claimed is:

1. A light supply unit comprising:
    at least two optical fiber groups including a plurality of optical fibers having first ends and second ends;
    a plurality of semiconductor light emitting devices;
    a plurality of optical connectors, provided for the respective semiconductor light emitting devices, for optically connecting the first ends of the optical fibers to the respective semiconductor light emitting devices;
    a controller, electrically connected to the semiconductor light emitting devices, for controlling light emissions of the semiconductor light emitting devices;
    a substrate on which the semiconductor light emitting devices are mounted;
    a housing containing the substrate and the controller; and
    a cooling device, contained in the housing, for cooling the semiconductor light emitting devices;
    wherein said optical fiber groups extend from the first ends to respective illumination positions different from each other.

2. The light supply unit according to claim 1, further comprising a battery, contained in the housing and electrically connected to the controller, for supplying a power to the controller for driving the semiconductor light emitting devices.

3. The light supply unit according to claim 1, further comprising a converter, contained in the housing and electrically connected to the controller, for converting an AC power supplied from the outside, into a DC power supplied to the controller.

4. The light supply unit according to claim 1, further comprising:
    a storage battery, contained in the housing and electrically connected to the controller, for supplying a power to the controller for driving the semiconductor light emitting devices; and
    a solar cell, electrically connected to the storage battery, for charging the storage battery.

5. The light supply unit according to claim 1, further comprising a communicator, contained in the housing and
    electrically connected to the controller, for receiving from the outside an indication signal indicating the light emissions of the semiconductor light emitting devices, and for providing the indication signal for the controller.

6. The light supply unit according to claim 1, further comprising a water heater, contained in the housing, making use of heat generated from the semiconductor light emitting devices.

7. The light supply unit according to claim 1, further comprising a heat accumulator, contained in the housing, making use of heat generated from the semiconductor light emitting devices.

8. The light supply unit according to claim 1, further comprising a slot, contained in the housing, for holding the substrate detachably.

9. The light supply unit according to claim 1, further comprising a recorder, contained in the housing and electrically connected to the controller, for recording operation logs of the semiconductor light emitting devices.

10. The light supply unit according to claim 1, wherein said controller comprises:
  a memory having a program stored for controlling the light emissions of the semiconductor light emitting devices; and
  a CPU for reading the program from the memory and executing the program.

11. The light supply unit according to claim 10, wherein said controller temporally controls light intensities of the semiconductor light emitting devices.

12. The light supply unit according to claim 1, further comprising an output terminal, electrically connected to the controller, for outputting operation log data of the semiconductor light emitting devices to the outside.

13. The light supply unit according to claim 1, which is equipped in a vehicle.

14. The light supply unit according to claim 1, further comprising a color filter optically coupled to at least one of the second ends of the optical fibers.

15. The light supply unit according to claim 1, further comprising a light diffusing filter optically coupled to at least one of the second ends of the optical fibers.

16. The light supply unit according to claim 1, wherein said semiconductor light emitting devices are blue light emitting diodes.

17. The light supply unit according to claim 16, further comprising a fluorescent part, optically coupled to one of the second ends of the optical fibers, excited by blue light emitted from one of the blue light emitting diodes to emit visible light of a longer wavelength than the blue light.

18. The light supply unit according to claim 1, wherein said semiconductor light emitting devices are ultraviolet light emitting diodes.

19. The light supply unit according to claim 18, further comprising a fluorescent part, optically coupled to one of the second ends of the optical fibers, excited by ultraviolet light emitted from one of the ultraviolet light emitting diodes to emit visible light of a longer wavelength than the ultraviolet light.

20. The light supply unit according to claim 1, wherein said semiconductor light emitting devices are blue laser diodes.

21. The light supply unit according to claim 20, further comprising a fluorescent part, optically coupled to one of the second ends of the optical fibers, excited by blue light emitted from one of the blue laser diodes to emit visible light of a longer wavelength than the blue light.

22. The light supply unit according to claim 1, wherein said semiconductor light emitting devices are ultraviolet laser diodes.

23. The light supply unit according to claim 22, further comprising a fluorescent part, optically coupled to one of the second ends of the optical fibers, excited by ultraviolet light emitted from one of the ultraviolet laser diodes to emit visible light of a longer wavelength than the ultraviolet light.

24. An illumination unit used with the light supply unit as defined in claim 1 and located at the illumination position comprising:
  a holder for holding at least one of the second ends of the optical fibers in one of the optical fiber groups.

25. The illumination unit according to claim 24, further comprising a color filter optically coupled to at least one of the second ends of the optical fibers.

26. The illumination unit according to claim 24, further comprising a light diffusing filter optically coupled to at least one of the second ends of the optical fibers.

27. The illumination unit according to claim 24, further comprising a light reflector optically coupled to at least one of the second ends of the optical fibers.

28. The illumination unit according to claim 24, further comprising a lens optically coupled to at least one of the second ends of the optical fibers.

29. The illumination unit according to claim 24, which is equipped in a vehicle.

30. The illumination unit according to claim 24, further comprising:
  a fluorescent part, optically coupled to at least one of the second ends of the optical fibers, excited by blue light to emit visible light of a longer wavelength than the blue light.

31. The illumination unit according to claim 24, further comprising:
  a fluorescent part, optically coupled to at least one of the second ends of the optical fibers, excited by ultraviolet light to emit visible light of a longer wavelength than the ultraviolet light.

32. An illumination system comprising:
  said light supply unit as defined in claim 1; and
  at least two illumination units as defined in claim 24, located at the illumination positions different from each other.

33. The illumination system according to claim 32, which is equipped in a vehicle, wherein two of the illumination units are arranged as headlights.

34. The illumination system according to claim 32, which is equipped in a vehicle, wherein one of the illumination units is arranged as an interior light.

35. The illumination system according to claim 32, which is equipped in a vehicle, wherein one of the illumination units is arranged as a taillight.

* * * * *